United States Patent [19]

Ryu et al.

[11] Patent Number: 5,528,671
[45] Date of Patent: Jun. 18, 1996

[54] NETWORK CONTROL SYSTEM

[75] Inventors: Tadamitsu Ryu, Yokohama; Yoshio Mogi, Tochigi; Takanori Fukatsu, Kawasaki; Hideyo Okazaki, Hachioji; Gen Kakehi; Akira Hashimoto, both of Yokohama; Mamoru Endo, Sagamihara; Mitsuhiko Yamagata, Kuki, all of Japan

[73] Assignee: Fujitsu Limited, Kawasaki, Japan

[21] Appl. No.: 700,159

[22] PCT Filed: Sep. 11, 1990

[86] PCT No.: PCT/JP90/01162

§ 371 Date: May 14, 1991

§ 102(e) Date: May 14, 1991

[87] PCT Pub. No.: WO91/04621

PCT Pub. Date: Apr. 4, 1991

[30] Foreign Application Priority Data

| | | | |
|---|---|---|---|
| Sep. 14, 1989 | [JP] | Japan | 1-239381 |
| Oct. 17, 1989 | [JP] | Japan | 1-270043 |
| Dec. 26, 1989 | [JP] | Japan | 1-337034 |
| Jan. 12, 1990 | [JP] | Japan | 2-4810 |
| Jan. 18, 1990 | [JP] | Japan | 2-9334 |

[51] Int. Cl.$^6$ .............................................. H04M 11/00
[52] U.S. Cl. .................... 379/93; 379/96; 379/94
[58] Field of Search ........................ 379/93, 94, 96, 379/97, 98, 57, 88, 89, 211, 214; 358/402

[56] References Cited

U.S. PATENT DOCUMENTS

| | | | |
|---|---|---|---|
| 4,555,781 | 11/1985 | Baldry et al. | 370/60 |
| 4,853,952 | 8/1989 | Jachmann et al. | 379/94 |
| 4,866,758 | 9/1989 | Heinzelmann | 379/94 |
| 4,893,335 | 1/1990 | Fuller et al. | 379/57 |
| 4,916,726 | 4/1990 | Morley, Jr. et al. | 379/214 |
| 4,953,159 | 8/1990 | Hayden et al. | 379/204 |
| 4,961,216 | 10/1990 | Baehr et al. | 379/89 |
| 4,975,896 | 12/1990 | D'Agosto, III et al. | 379/94 |
| 5,034,916 | 7/1991 | Ordish | 379/96 |
| 5,056,003 | 10/1991 | Hammer et al. | 364/200 |
| 5,067,104 | 11/1991 | Krishnakumar et al. | 395/375 |
| 5,218,713 | 6/1993 | Hammer et al. | 395/800 |
| 5,299,255 | 3/1994 | Iwaki et al. | 379/96 |

FOREIGN PATENT DOCUMENTS

| | | |
|---|---|---|
| 0205948 | 12/1986 | European Pat. Off. . |
| 0264092 | 4/1988 | European Pat. Off. . |
| 0289248 | 11/1988 | European Pat. Off. . |
| 0330835 | 9/1989 | European Pat. Off. . |
| 2139043 | 10/1994 | United Kingdom . |

OTHER PUBLICATIONS

ACM Transactions on Computer Systems, vol. 5, No. 2, May 1987, New York US, pp. 97–120, R. W. Watson et al. "Gaining Efficiency in Transport Services by Appropriate Design and Implementation Choices" * paragraph 2.1.2 *.
1988 International Zurich Seminar on Digital Communications Mar. 1988, Zurich, CH, pp. 93–98, E. Mumprecht et al. "Timers in OSI Protocols—Specification Versus Implementation" * paragraph 5 *.

*Primary Examiner*—Curtis Kuntz
*Assistant Examiner*—Stella L. Woo
*Attorney, Agent, or Firm*—Staas & Halsey

[57] ABSTRACT

In a network control system connecting terminal units providing at least a chat function to make communication with the other terminal units on a real time basis while connecting the keyboard and executing mutual communication between the terminal units, the terminal unit which becomes the transmitting side describes the mode corresponding to the function to be executed and sets a communication code corresponding to such mode within a communication command to be transmitted. The transmitting terminal indexes a connection timing table and also connects or disconnects the line for communication to the distant terminal unit on the basis of contents of the connection timing table in order obtain cost-effective application of the communication network.

1 Claim, 30 Drawing Sheets

MAIN FLOW

FIG. 9

| | MODE | CONNECTION | DISCONNECTION |
|---|---|---|---|
| (1) | SCREEN DISPLAY | TRANSMISSION OF TS, CS, VS | RECEPTION OF OK DATA |
| | | TRANSMISSION OF TR, CR, VR | RECEPTION OF REAL DATA |
| | | TRANSMISSION OF MM, MN | RECEPTION OF OK DATA |
| (2) | DISTRIBUTION | ML, MI | RECEPTION OF OK DATA |
| (3) | CHAT | CH | RECEPTION OF CHAT END DATA |
| (4) | SAVING | ES, ET, EU | RECEPTION OF OK DATA |
| (5) | TEMPORARY CENTER | KS, KC, KM, KT, KO KA, KB, OT, OI, OD IS, IB, IC, TN, TC | RECEPTION OF OK DATA |
| (6) | PERSONAL ID | PA, PB, PC, ID, IE | RECEPTION OF OK DATA |
| (7) | CLOCK | TT, TD, TE | RECEPTION OF OK DATA |

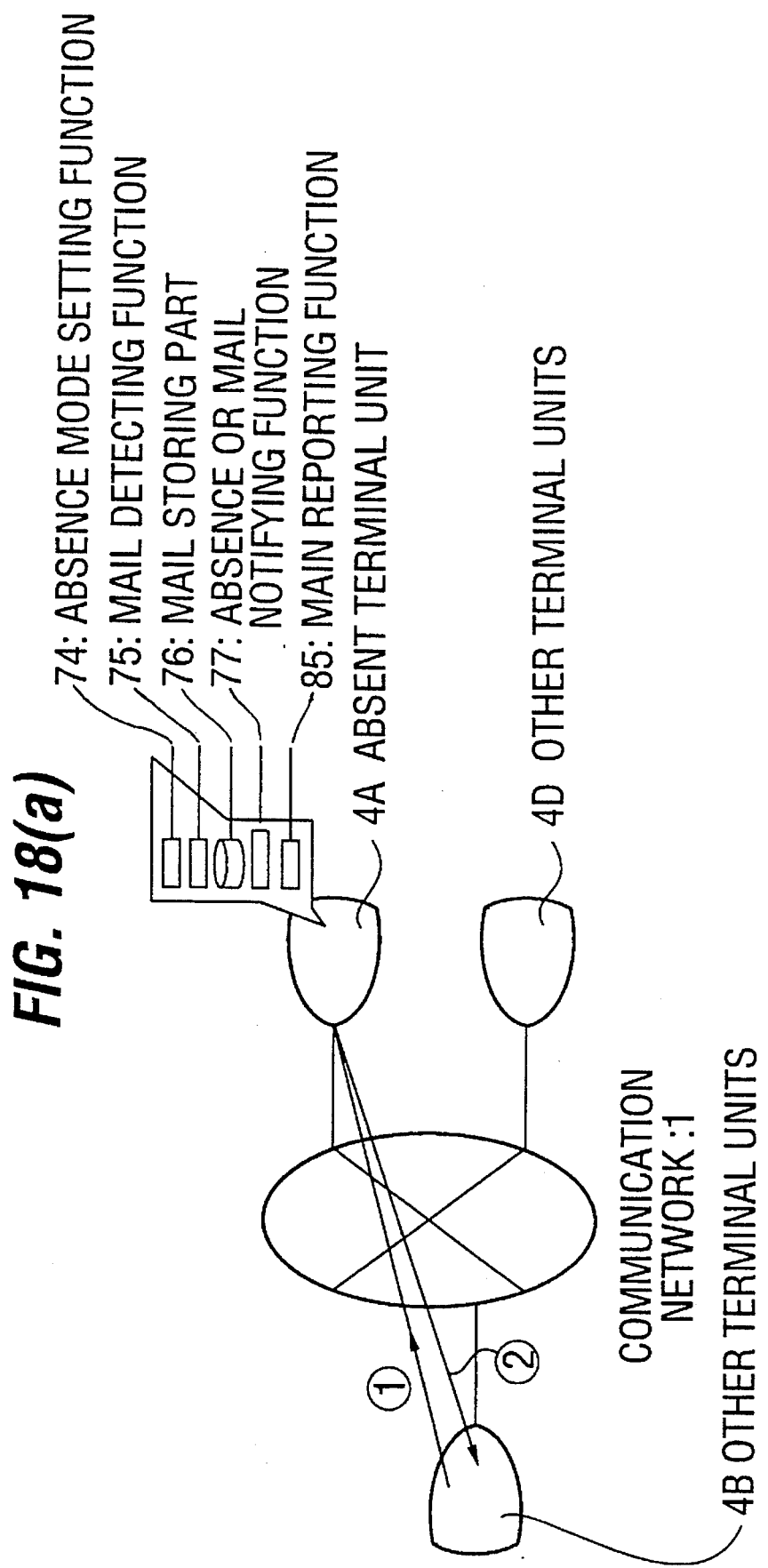

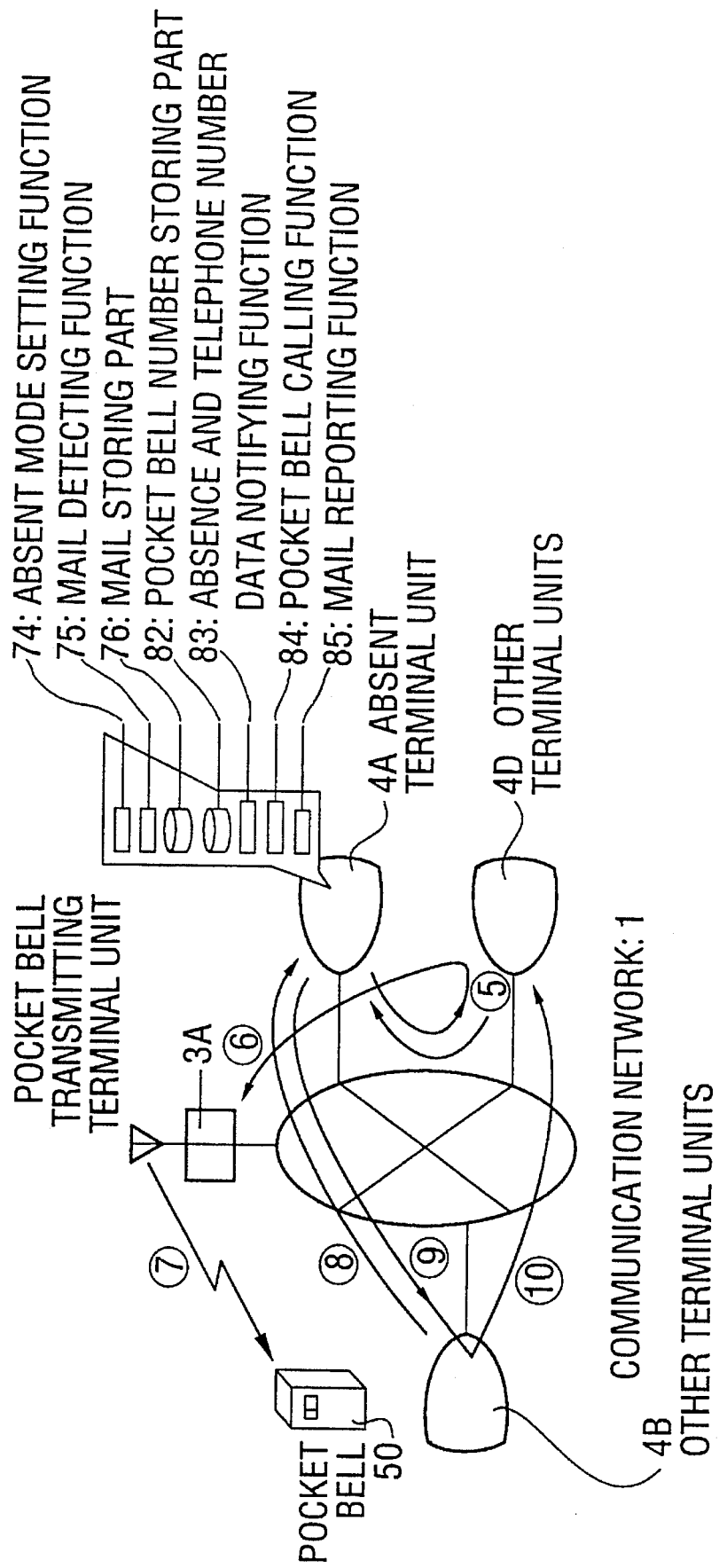

NETWORK CONTROL SYSTEM

BACKGROUND OF THE INVENTION

1. Field of the Invention

The present invention relates to a network control system for offering a plurality of remote services such as chat (electronic dialogue), distribution of data (mail), RCS (remote computer service) and processing for a non-attendant subscriber.

Recently, it has been considered to execute processing while realizing communication with remote terminal units through a communication network and it is therefore desired to effectively utilize the communication line for this purpose. Moreover, for communication within the public network or in the network coupling the public network and private network, a low cost communication network may have enough capacity in some cases for use in connection profile of networks. However, when for instance a large amount of images are transmitted as in recent communications, reduction of communication cost becomes a very important problem. In addition, if a distant subscriber is absent, it is now desired to provide a system which can urgently call the distant subscriber.

2. Description of the Related Art

Recently, a communication network has grown more and more complicated as shown in FIG. 29. Namely, certain terminal units are connected with a public network and certain terminal units are coupled with a private line (so-called private leased line network) and these terminal units are capable of communicating a variety of information including image information.

FIG. 29 shows an example of the network. In this figure, the numeral 1 denotes public network; 2, private line; 10A, 10B, 10C, 10D, groups respectively; 3A, 3B, 3C, 3D, terminal units as control stations; 4A, 4B, 4C, 4D, ordinary terminal units respectively.

The terminal units 3A and 4A, 3B and 4B, etc. are connected with the same communication network and are regionally adjacent and thereby classified into the groups 10A, 10B, etc.

In each group, at least one terminal unit functioning as control station 3A, 3B, etc. is provided and some control stations are connected with both the public network 1 and private line 2.

Under the network as shown in FIG. 29, it has been recently desired to execute a plurality of remote services between terminal units, such as chats, message distribution (mail), RCS (Remote Computer Service) and processing for the distant subscriber who is absent. It is certainly desired to realize the remote service as explained above but the following problems arise.

Namely, in the prior art, since the communication line is continuously set open during the services, a dead time when transmission and reception are not directly carried out is also part of the communication cost. Moreover, to avoid such cost, it has been considered to open or close the communication line. However, in this case, an operator must take part in the operation.

Moreover, an application charge of a public network is not proportional to application distance. The application charge in a certain application area may sometimes be higher than the sum of the charge to a certain intermediate point and the charge to the target point from such intermediate point. However, in this case, an application profile in which the charges are lowered, for example, by employing a repeating means does not presently exist now.

Moreover, even in a case where a plurality of long-length distant terminal units for transferring data are distributed and the distant terminal units are located very closely, it is necessary to individually send data through long-length communication to respective distant terminal units.

Private lines have been provided for reduction of communication cost. It is desired to create a connection profile taking advantage of the cost merit of private line while also taking advantage of the nation wide scale of the public network considering the conditions of respective terminal units for making communication to terminal units on the public network from terminal units connected to such private line, or to terminal units on the private line from that of the public network.

Furthermore, realization of message distribution (mail) introduces the following problems.

FIGS. 30(a) and (b) schematically show systems as in the prior art for distributing real data to other terminal units (receiving station) 122–124 from one terminal unit (transmitting station) 121. In FIG. 30(a), the transmitting station 121 transmits the real data, for example, conference proceedings to be circulated to the first receiving station 122 and this receiving station 122 confirms and processes the contents of data received and then returns it to the transmitting station 121. When the transmitting station 121 confirms existence of the data returned from the first receiving station 122, it transmits such returned data to the second receiving station 123 and the second receiving station 123 also confirms and processes contents of data in the same way as explained above and then returns the data to the transmitting station 121. Such method is repeated, for example, for the stations after the third receiving station 124 to sequentially distribute real data from the transmitting station 121.

In the case of FIG. 30(b), when the transmitting station 121 transmits real data to the host center 130, this host center 130 then functions in place of the transmitting station 121 to send or receive the real data sequentially with the receiving stations 122–124.

In such prior art, after a certain receiving station receives real data, the real data checked and processed is always returned to the transmitting station and it is then transmitted to the next receiving station. The real data therefore goes forward and then backward through the communication path. As a result, a problem arises that since application of line becomes ineffective and the information system in the transmitting station or the host center must always be operated, the other necessary processings in the transmitting station are set in a queue condition.

In addition, realization of RCS explained above also introduces the following problems.

FIG. 31 is a diagram for explaining the prior art indicating the inter-terminal communication.

In FIG. 31, 201 denotes a predetermined terminal; 202 (202-1–202-6), terminal units other than the predetermined terminal unit 201 (ordinary terminal unit); 215, switching equipment and communication network (or public network).

Communication between terminal units 202 is carried out, as shown in FIG. 31, through the predetermined terminal unit 201. The predetermined terminal unit 201 is a computer (hereinafter referred to as host) determined as host for communication between terminal units in this network.

For example, when the terminal unit 202-1 wants to start communication with the terminal unit 202-3, the following processes are carried out. First, the request issuing terminal unit 202-1 connects the line to the host 201 through the switching equipment and communication network 215 and notifies the terminal unit number of the terminal unit 202-3. The host 201 knows the telephone number of the terminal unit 202-3 from this terminal unit number and connects the line to the terminal unit 202-3 through the switching equipment and communication network 215. Thereafter, data transfer is carried out between the terminal units 202-1 and 202-3. First, data is sent, for example, to the host 201 from the terminal unit 202-1 and this data is then sent to the terminal unit 202-3 from the host 201. Therefore, the host 201 executes the processing (data-through processing) to send the data received from the line connected to the terminal unit 202-1 to the line connected to the terminal unit 202-3.

When communication to the terminal unit 202 is carried out through the data-through processing executed by the host (predetermined terminal unit) 201 as explained above, however, the following problems are generated.

As shown in FIG. 31, a plurality of communications such as communication between terminal units 202-1 and 202-3, communication between terminal units 202-2 and 202-4 and communication between terminal units 202-5 and 202-6 are carried out almost simultaneously to the host 201. In this case, it is necessary to conduct the data-through processing by processing respective communication requests, but the resultant load becomes heavy for the host 201. Accordingly, it is probable that the host 201 can no longer execute the other processes. On the contrary, since the host 201 is not a switching equipment but a computer, the number of connecting lines and the switching function are restricted. Therefore, if the communication requests are concentrated at one time, communication becomes impossible in some cases.

During the processing conducted when the distant subscriber is absent, the following problems are also encountered.

In the case of asking an operator to search a supervisor of the absent terminal unit, the situation becomes troublesome because the supervisor is requested to previously notify the destination to the operator of its own terminal unit. Moreover, if the supervisor has forgotten to notify the destination to an operator, a problem occurs that it is no longer possible to find out the destination of the supervisor. In the case of searching for the destination of the supervisor by utilizing an absent transfer function of the telephone set, a problem also rises that if the destination of the supervisor changes from time to time, it is also impossible to find out the destination of the supervisor. Namely, the absent terminal unit is not provided with a function to make communication with the transmitting other terminal units and furthermore is not provided with a function to search the supervisor.

SUMMARY OF THE INVENTION

The present invention is intended among other things to solve the various problems explained above. FIG. 1 is a diagram for explaining the principle of the present invention. In FIG. 1, numeral 1 denotes a public communication network; 2, a private line; 10A, 10B, 10C, 10*d*, groups; 3A, 3B, 3C, 3D, terminal units as control station; 4A, 4B, 4C, 4D, ordinary terminal units.

The terminal units 3, 4 are respectively classified into the groups 10A, 10B, etc., upon judgment that these are connected to the same communication network and are closed regionally.

Each group allows existence of at least one terminal unit 3A, 3B, etc., as the control station and is provided with an extracting function and a notifying function. For instance, the extracting function of the terminal unit 3A as the control station is structured so that the terminal information can be detected as shown in FIG. 1 by (i) holding the terminal units (3A, 4A) belonging at least to the self group 10A in the memory and (ii) making enquiry to the corresponding terminal units 3B, 3C as the control station as required for the terminal units (3B, 4B, 3C, 4C etc.) belonging to the other terminals 10B, 10C, whether these should be held in the memory or not.

In regard to the terminal information, the following meanings are ascribed:

(i) I-NO: Described as the terminal unit ID (ii) Group name: Described as the control station terminal unit ID to be incorporated to any control station terminal unit (iii) Type: Described as the network ID to be connected to any network (iv) Communication mode: Described to be connected in any connecting mode The terminal units 3A, 3B, 3C, 3D and terminal units 4A, 4B, 4C, 4D have a structure conceptionally indicated in the lower half region of FIG. 1. Namely, 4A in the figure corresponds to the upper half region of FIG. 1. 13 denotes a transmitting processing function part; 14, a receiving processing function part; 15, a transmitting table; 16, a receiving table; 17, a connection timing table prepared by the present invention; 18, distribution command for distributing to various processes corresponding to reception based on concentration of received communication commands; and 19-1, 19-2 indicate application processing programs.

The transmitting table 15 and receiving table 16 function to temporarily buffer the communication commands to be transmitted and the received communication command. The transmitting processing function part 13 and receiving processing function part 14 function to take a measure for communication protocol corresponding to various services, for example, the remote computing service of the terminal units 3*i* and 4*i*. The relevant service includes the screen display function for transmitting at least the information including the display screen to the other terminal units to display such information and the chat function for making communication with a other terminal units on the real time basis by operating the keyboard.

The connection timing table 17 describes each "mode" corresponding to various services and instructions for opening and closing communication lines corresponding to various communication codes under the relevant operation mode.

Corresponding to transmission of communication commands to another terminal unit, for example, 4B, the mode and communication code described in the relevant communication command are decoded, the connection timing table 17 is indexed on the basis of the relevant mode and communication code and the communication line is opened or closed in accordance with the content of table 17.

Namely, the communication line is closed or opened corresponding to an individual communication code under an individual mode. For instance, in the course of mail processing to distribute information to other terminal units, the communication line is opened corresponding to the communication command describing the mail notification (ML) code or mail substitution (MI) code and is closed corresponding to reception of OK data from the distant terminal unit. Moreover, in the case of screen display processing, (i) the communication line is opened corresponding to a communication command describing the terminal unit output data transmitting (TSO) code, fixed data transmitting (CS) code and variable data transmitting (VS) code and is closed corresponding to reception of the OK data from the distant terminal unit, (ii) the communication line is opened corresponding to a communication command describing terminal unit output data request (TR) code, fixed data request (CR) code and variable data request (VR) code and is closed corresponding to reception of the real data from the distant terminal unit, (iii) the communication line is opened corresponding to a communication command describing the missing mode notification (MM) code and missing mode cancellation (MN) code and is closed corresponding to reception of correctly received data from the distant terminal.

At the receiving side terminal unit, various processes are distributed corresponding to reception and respective processes are executed based on the contents of communication commands transmitted from the distant terminal units.

FIG. 2 shows the main flowchart indicating the processing profile at the terminal unit in the present invention.

The terminal unit executes ordinary processes corresponding to start of system operation. When the operation mode, (i) chat (or electronic dialogue) mode, (ii) distribution (mail) mode, (iii) RCS mode, (iv) processing for absent distant subscriber (absent registration/processing as shown in the figure) is designated, for example, manually during ordinary processing, any designated processing is executed. Of course, in the case of the other modes, the ordinary processing corresponding thereto is executed, completing the operation.

BRIEF DESCRIPTION OF THE DRAWINGS

FIG. 9 is content of description as an embodiment of the connection timing table;

DESCRIPTION OF THE PREFERRED EMBODIMENTS

Figure 3:
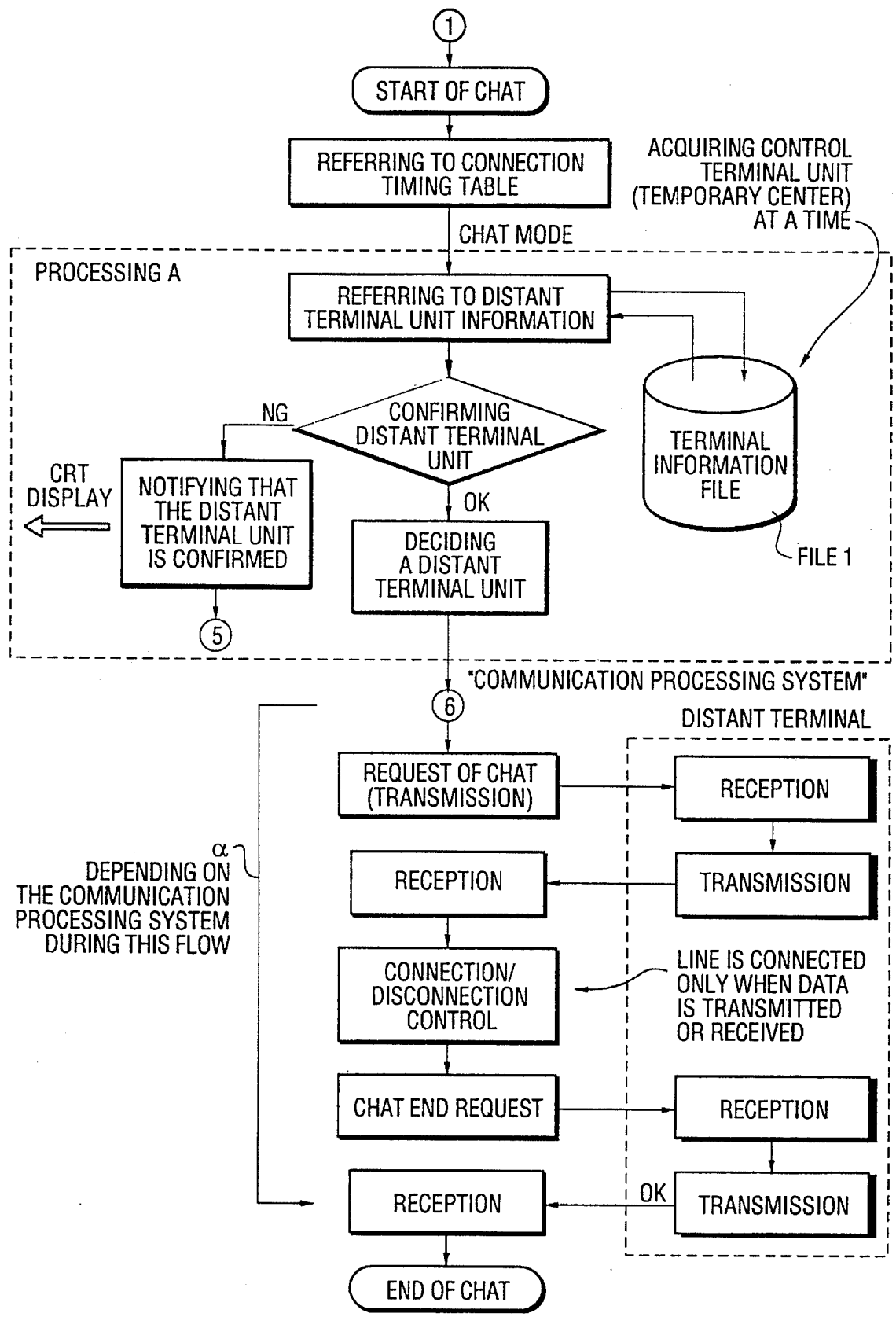
FIG. 3 is an operation flow of chat.
Figure 5:
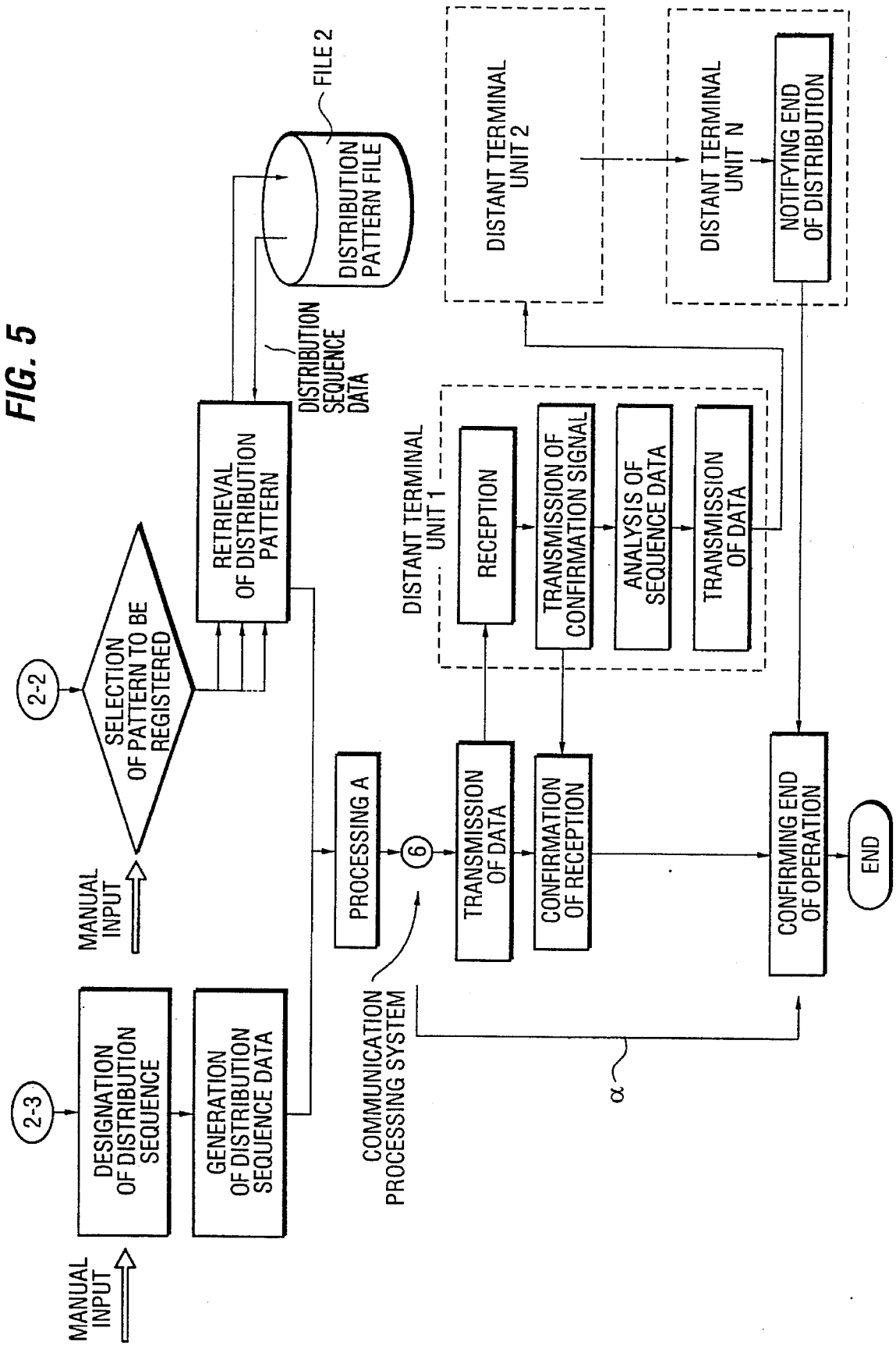
Figure 6:
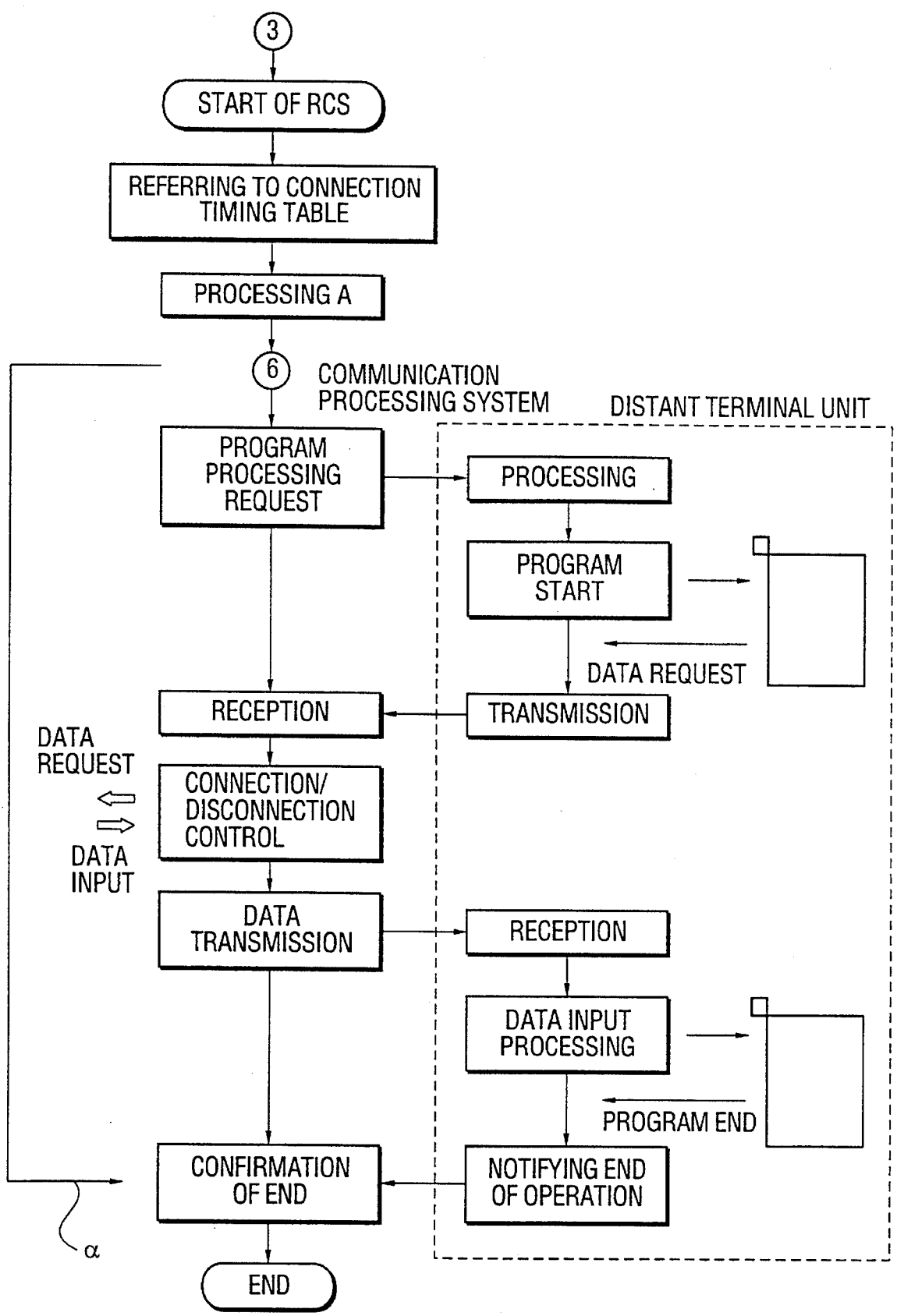
FIG. 6 is an operation flow of RCS.
Figure 7:
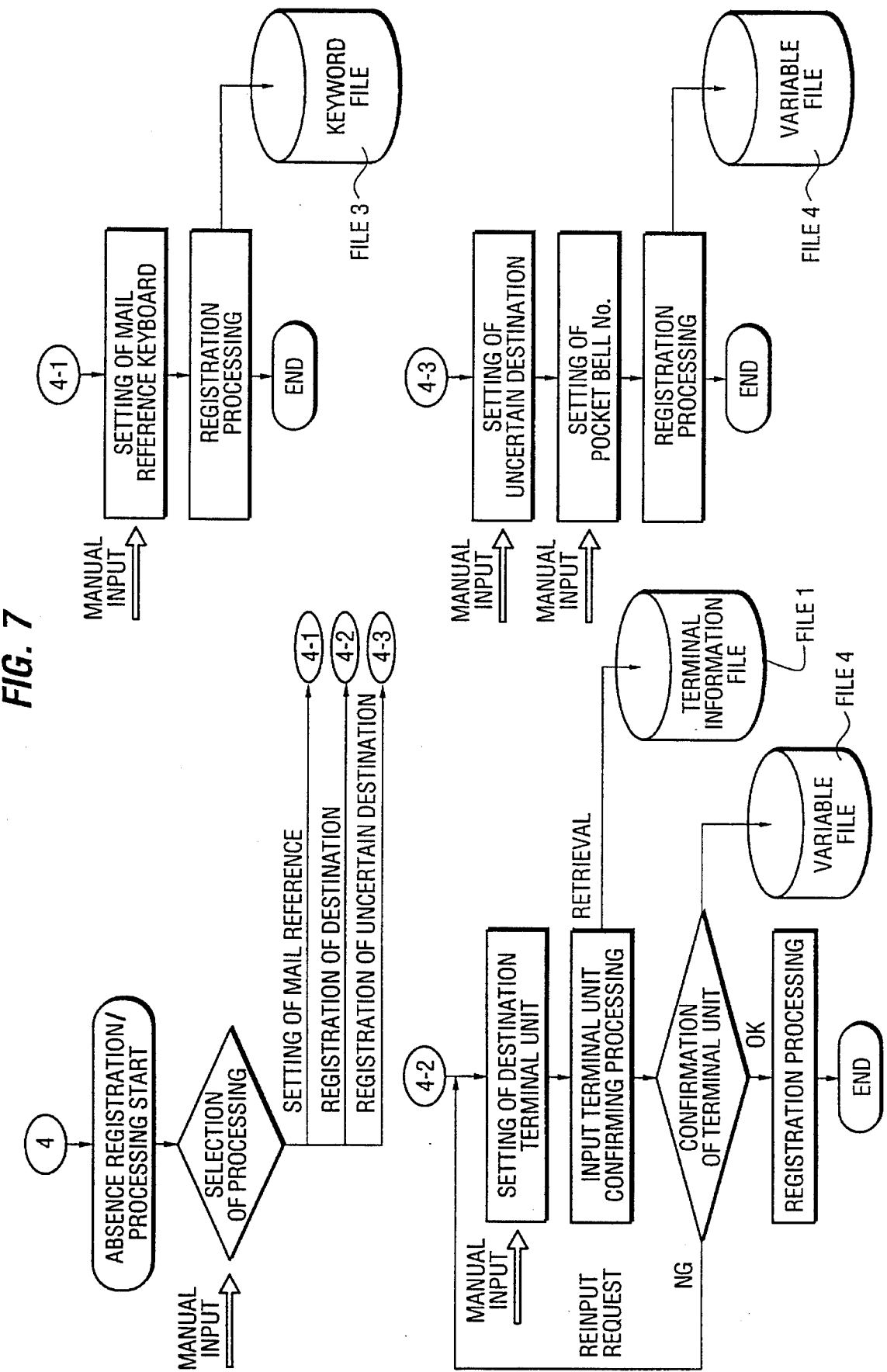
FIG. 7 is absent registration/processing start operation flow.
Figure 8:
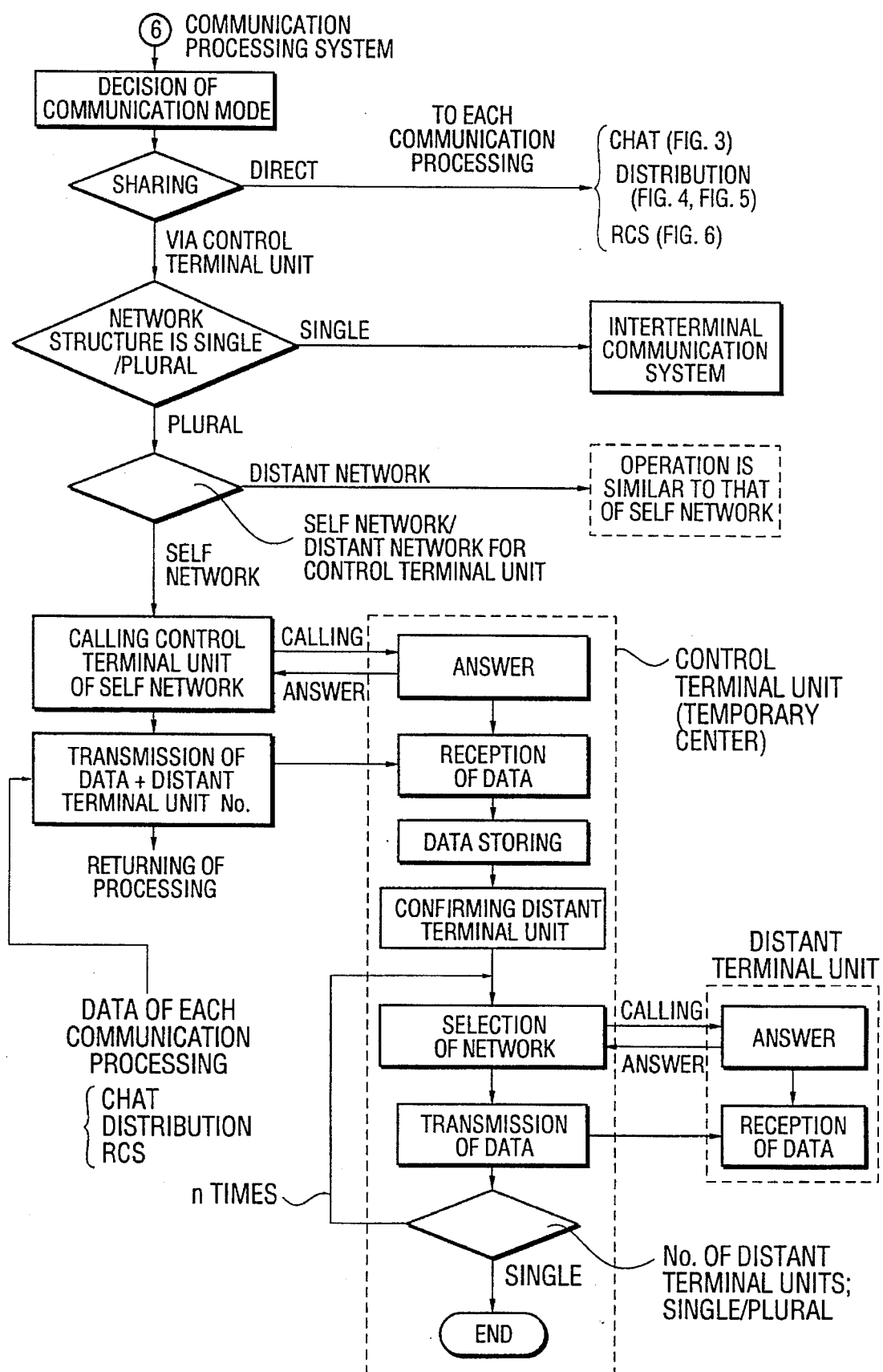
FIG. 8 is an operation flow of the communication processing system.

FIG. 3 indicates an operation flow of chat. FIG. 4 and FIG. 5 indicate operation flows of message distribution. FIG. 6 indicates an operation flow of RCS. FIG. 7 indicates absent registration/processing start operation flow. FIG. 8 summarizes operation flow of a "communication processing system" in the flow diagrams shown in FIG. 3 to FIG. 6.

As an example of a communication command used in the present invention, a data format

YY XX (XXXX, XXXX, XXXX)

is provided, wherein:

(i) YY indicates start of communication;

(ii) Next two characters (XX) give the communication code. This code is always followed by the left-hand parenthesis "(".

(iii) Next to the parenthesis (a self terminal unit number (ordinary given by 9 digits) and the other terminal unit number (ordinarily given by 9 digits) are described.

(iv) Following the other terminal unit number, a logic command (ordinary given by 6 digits) is given. Content of the logic command designates the relevant operation "mode" in the present invention.

(v) Following the logic command, the brackets [XX . . . ] are used when data is required. Data is written between the brackets.

(vi) Finally, the data is completed with the parenthesis")".

FIG. 9 indicates contents of the connection timing table in rows corresponding to the relevant modes.

(1) In the screen display processing mode,
 (i) The communication line is opened corresponding to transmission of a communication command describing any of the communication codes TS, CS and VS and then closed corresponding to reception of OK data from a distant terminal unit.
 (ii) The communication line is opened corresponding to transmission of a communication command describing any of the communication codes TR, CR and VR and then closed corresponding to reception of real data from a distant terminal unit.
 (iii) The communication line is opened corresponding to transmission of a communication command describing any of the communication codes MM and MN and then closed corresponding to reception of OK data from a distant terminal unit.

(2) In the mail processing mode for message distribution, the communication line is opened corresponding to transmission of a communication command describing any of the communication modes ML and MI and is then closed corresponding to reception of OK data from a distant terminal unit.

(3) In the chat processing mode, the communication line is opened corresponding to transmission of a communication command describing the communication code CH and is then closed corresponding to reception of chat end data from a distant terminal unit.

In the same way, the communication line is opened (refer to the connection column in the figure) corresponding to transmission of a communication command describing various communication codes indicated in the figure and is then closed corresponding to reception of the contents described in the disconnection column in the figure, in accordance with the save processing mode (4) where data is saved to the other terminal units when a fault is generated, the temporary center processing mode (5) established for making communication with the host, personal ID processing mode (6) for transmitting a personal ID, and clock processing mode (7) for sending clock data.

Various specific communication codes designate the processings as indicated in Table 1.

TABLE 1

| | | |
|---|---|---|
| TS | Transmission of | Transmission of T output data |
| CS | data parts | Transmission of fixed data |
| VS | | Transmission of variable data |
| TR | Request of data | Request of T output data |
| CR | parts | Request of fixed data |
| VR | | Request of variable data |
| ML | Mail | Mail notification |
| MI | | Mail substitute |
| CH | Chat | Chat mode |
| ES | | Notification of T-No to be |
| | Save control | saved and saving of data transmission |
| ET | | Returning of data from T-No |
| EU | | Terminal unit returns saved data |
| EI | | Request of file substitute |
| KS | | Notification of temporary center center T-No. |
| KC | | Notification of change of temporary center |
| KM | Temporary center control | Notification of temporary center T-No. |
| KT | | Notification of partner T-No. |
| KO | | Notification only to temporary center |
| KA | | Notification of plural data to temporary center |
| KB | | Notification to plural centers |
| KN | | Notification of group name |
| PA | Registration of personal ID | Registration of personal ID data |
| PB | | Request of personal ID data (address) |
| PC | | Notification of level |
| PM | | Request of charging address |
| KL | KW label | Notification of KW label |
| IS | External control contents | External registration of contents |
| IB | | Transfer of contents |
| IC | | Update of contents |
| MM | Missing mode | Notification of missing mode |
| MN | control | Cancellation of missing mode |
| TN | Notification of | Request of partner T-No. |
| TC | label | Transfer of partner T-No. data |
| TT | | Notification of clock center T-No. |
| TD | Notification of | Request of clock data |
| TE | clock data | Transfer of clock data |

TABLE 1-continued

| | | |
|---|---|---|
| TC | | Declaration of clock center |
| OT | Transmission and reception at | Notification of T-No. to the other temporary centers |
| OI | plural temporary centers | Notification of contents to the other temporary centers |
| OD | | Notification of ID-NO. to the other temporary centers |
| ID | Check of ID-NO. | Check of ID-NO. |
| IE | | Returning of label/level |
| WC | Transmission and | Declaration of KW center |
| WT | reception of KW data at KW center | Notification of T-No. to KW center |
| WS | | Notification of KW data/Notification of T-No. to the same KW center |
| WA | | KW enquiry/notification of command request |
| RP | | Start of program |
| RM | RCS | Display of message |
| RD | | Asking for data input |
| UG | Application frequency control | Transfer of application frequency control screen |
| UI | | External registration of contents for application frequency |
| FM | Catch-up mode | Catch-up call mode |
| FP | | Calling a pocket bell |
| MV | Transfer | Parts transfer |
| AR | Update of alarm condition | Transfer request of alarm sensor data |
| AS | | Transfer of alarm condition |
| C | Cluster type | |

Figure 1:
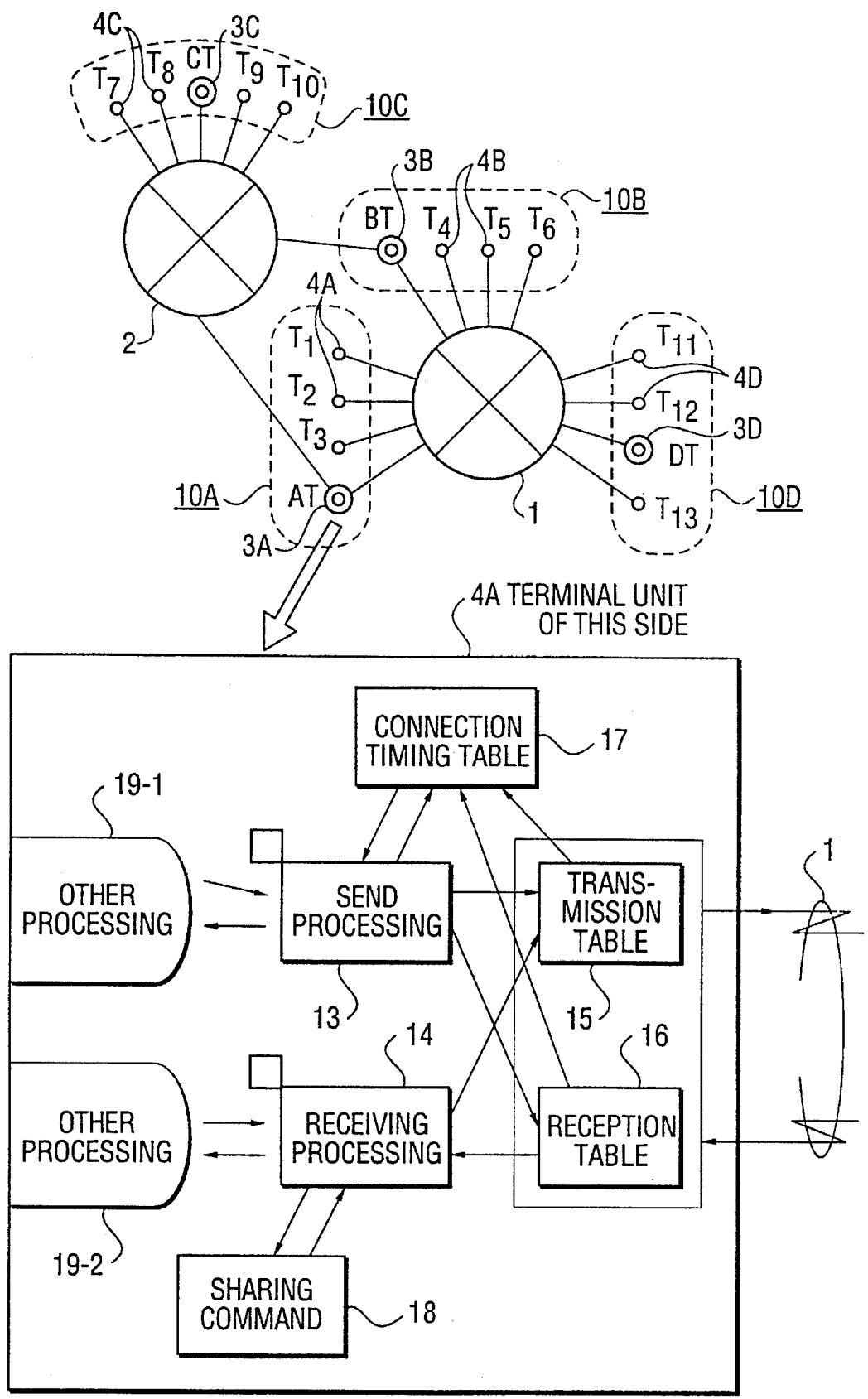
FIG. 1 is a diagram for explaining the principle of the present invention.
Figure 10:
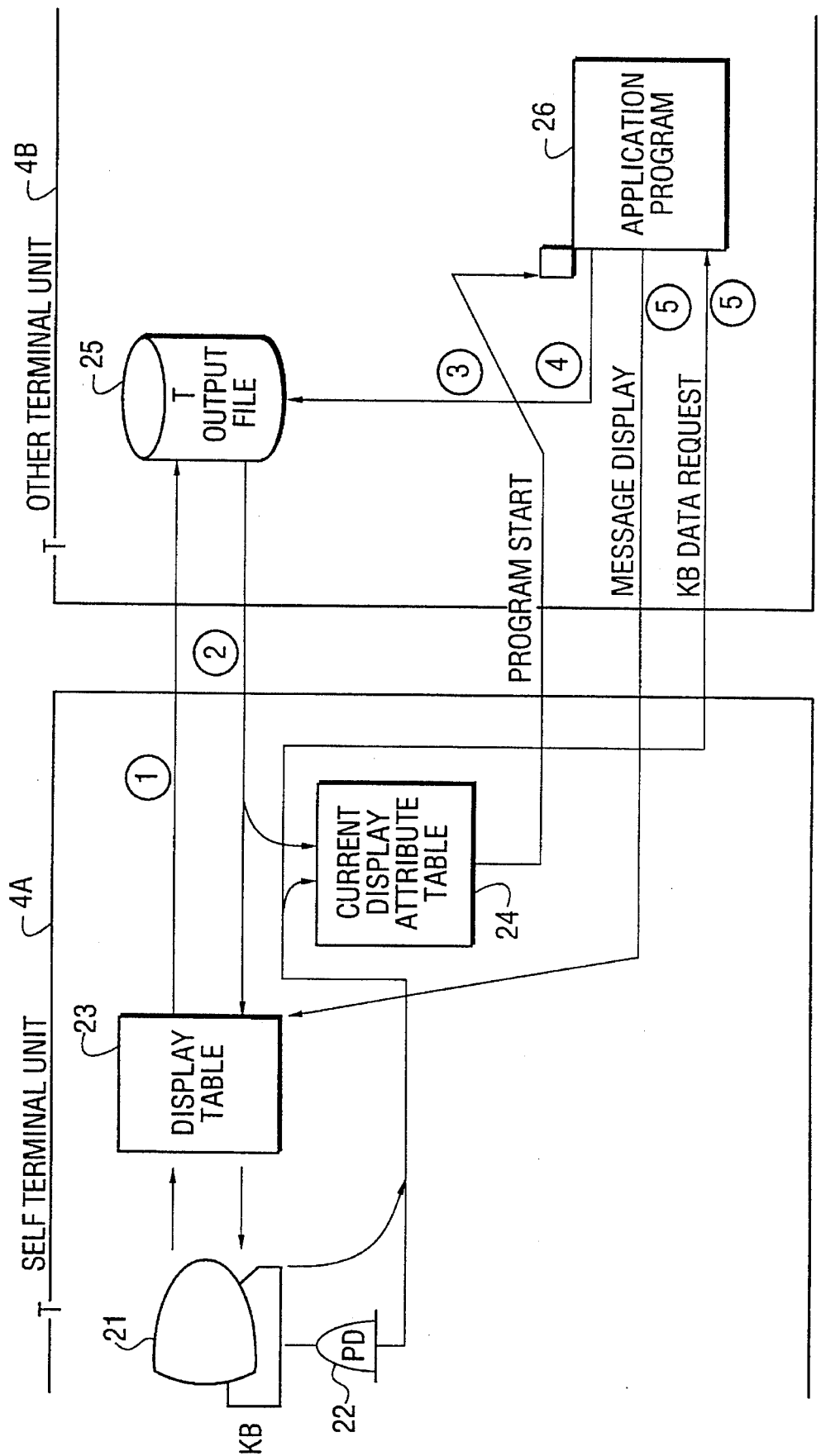
FIG. 10 is a diagram indicating an example of the screen display processing.

FIG. 10 shows an example of the screen display processing. 4A, 4B respectively correspond to FIG. 1. 21 denotes a display including a keyboard; 22, a pointing device; 23, a display table storing contents displayed on the display 21; 24, a current display attributes table describing attribute of the screen currently displayed on the display 21; 25, a terminal output file; 26, an application program.

When the terminal unit 4A requests the display generated by the other terminal unit 4B (processing 1), the requested screen is transferred from the terminal output file 25 of the terminal unit 4B. It is then displayed in the display 21 and is described in the current display attribute table 24 (processing 2). When an instruction is issued using the pointing device 22 at the terminal unit 4A, the program is started (processing 3). The started application program 26 is capable of displaying another screen for the terminal unit 4A connected now in accordance with the request of screen (processing 4). Moreover, the application program 26 sends a message to the display table 23 of the terminal unit 4A (processing 5) and is also receiving the data such as data input request from the terminal unit 4A (processing 5).

The flowchart will be explained next. If the chat mode is selected in the processing selection in FIG. 2, "processing A" of FIG. 3 is executed. The relevant "processing A" is carried out in the same manner at the area denoted "Processing A" in FIGS. 46.

In FIG. 3, reference is made to the connection timing table 17 as shown in FIG. 1, and the processing A starts. In the processing A, reference is also made to the distant terminal unit by indexing the terminal information file (File 1) existing in the terminal units 3A, 3B, 3C, 3D as the control station. Namely, based on the contents of connection timing table 17 shown in FIG. 1, the transmitting processing function part 13 utilizes the transmission table 15 to make communication with the control station terminal unit 3A and searches information of a distant terminal unit by indexing the terminal information file (FILE 1). Next, if the distant terminal unit cannot be confirmed (in the case of NG), the distant terminal unchecking information is displayed by CRT and the operation returns to point 5 of FIG. 2. However, when the distant terminal unit can be confirmed (in the case of OK), a type of the distant terminal unit is judged and communication in the chat mode starts.

The "communication processing system" including communication under the chat mode will be explained with reference to FIG. 8. The area wherein the arrow mark is described, like the brackets in relation to the "communication processing system" shown in FIG. 3, corresponds to the flow for making communication by a certain terminal unit directly with other terminal units without intervention of a control station terminal unit.

The transmitting processing function part 13 shown in FIG. 1 repeats the operations for opening (connecting) the communication line corresponding to chat request (transmission) and chat end request by indexing the connection timing table 17 and for receiving information from a distant terminal unit, but the line is disconnected (line is closed) when the data is not transmitted and received. In FIG. 3, the arrow mark indicates that the operation in the area corresponding to the arrow mark is the processing based on "communication processing system". This is also applied to FIGS. 4 to 6.

As shown in the operation flow of FIG. 3, the line is disconnected for each transmission and reception for communication in chat (electronic dialogue) mode and thereby the line application efficiency may be improved. The timings for connection and disconnection are described in the connection timing table.

Figure 2:
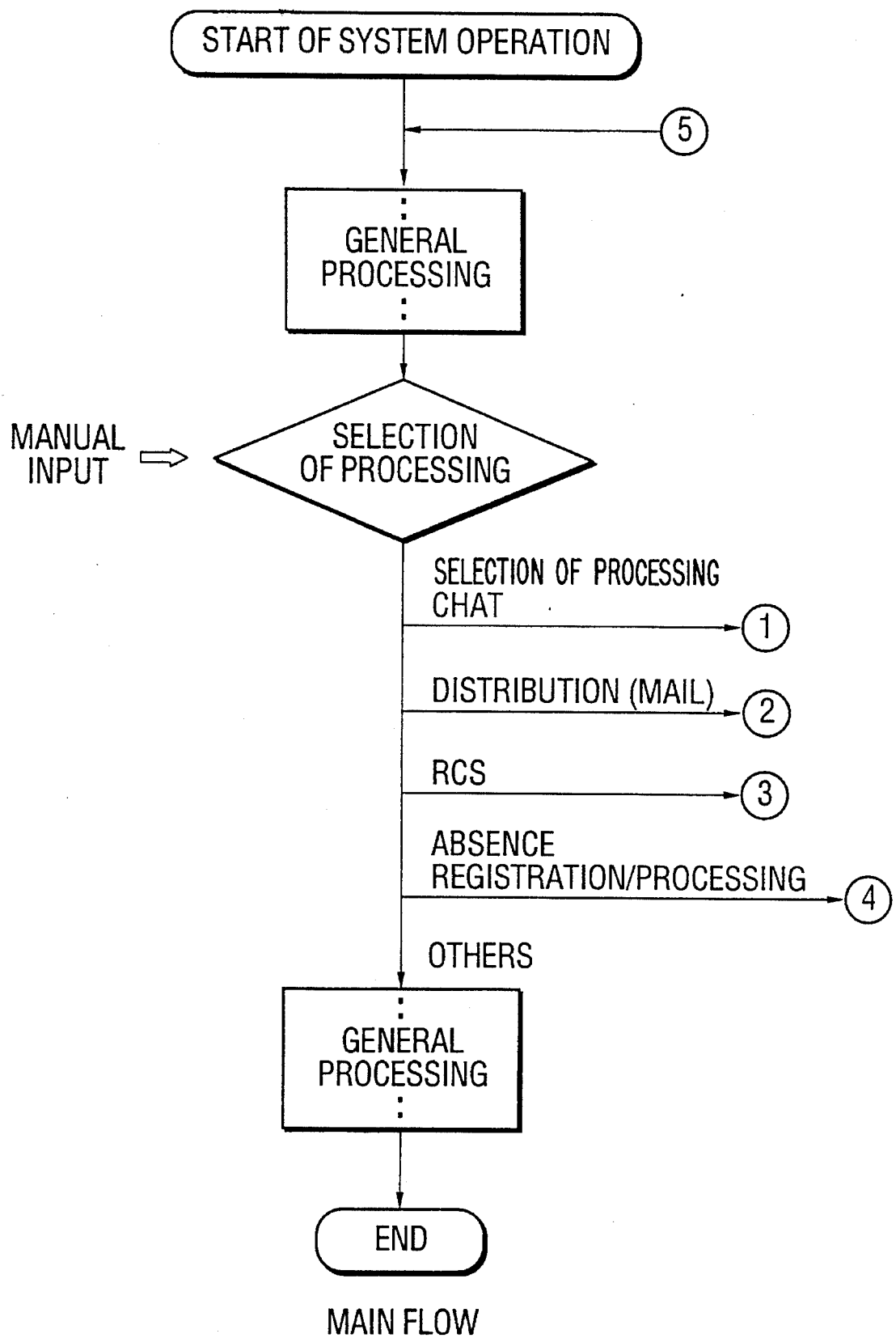
FIG. 2 is a main flow chart indicating the processing profile at the terminal unit.
Figure 4A:
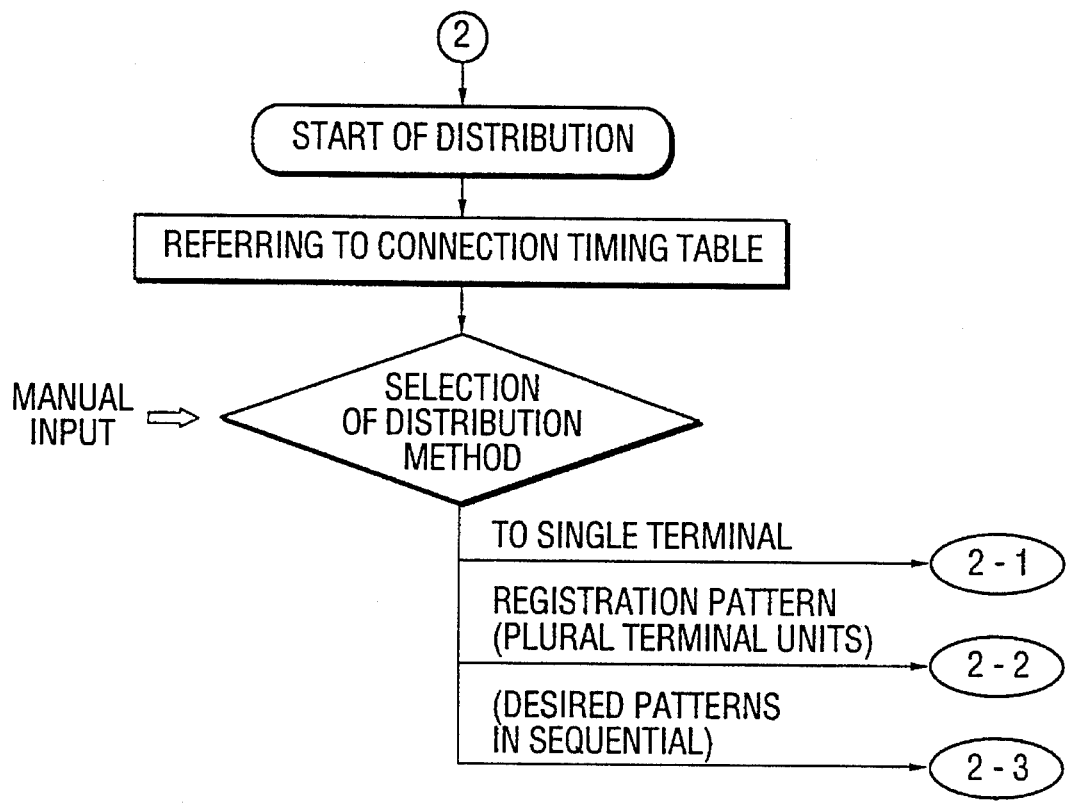
FIG. 4(A), FIG. 4(B) and FIG. 5 are operation flows of distribution.

If the message distribution mode is selected in the processing selection of FIG. 2, reference is made to the connection timing table (17 in FIG. 1) as shown in FIG. 4(A), and a distribution method is selected. As shown in the figure, processing proceeds to step (2-1) of FIG. 4(B) if "To single terminal unit" is designated, or to the step (2-2) of FIG. 5 if "Registered pattern (plural terminal units)" is designated, or to the step (2-3) of FIG. 5 if "Desired pattern" is designated. Here, the designation "To single terminal unit" means distribution to a single terminal unit, "registered pattern" means distribution to a plurality of terminal units in accordance with the distribution sequence pattern previously registered, and "desired pattern" means distribution to a plurality of terminal units in accordance with the desired distribution sequence pattern.

Figure 4B:
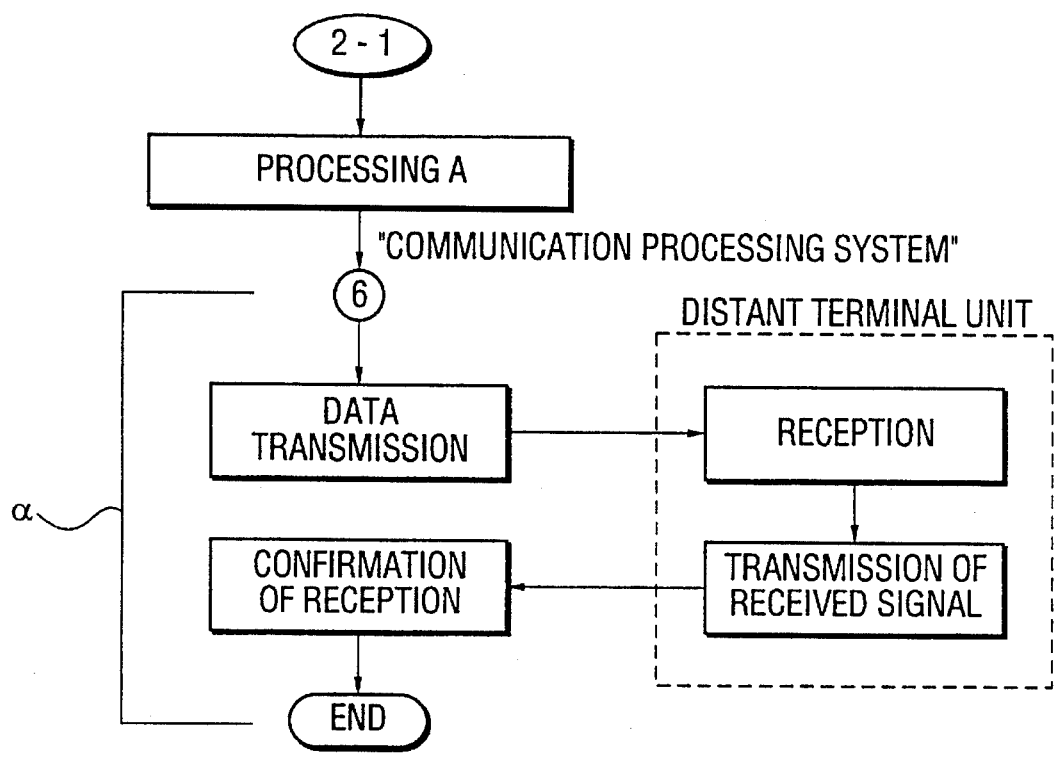

In the case of "To single terminal unit", data is transmitted to a distant terminal unit in the communication system" through the "processing A" shown in FIG. 3 and reception is confirmed as shown in FIG. 4(B).

In the case of "registered pattern", according to the instruction for selecting the registered pattern from the step (2-2) of FIG. 5, the "distribution pattern retrieval" is carried out. Namely, the previously registered distribution pattern is read from the distribution pattern file (FILE 2).

In the case of the "desired pattern" the distribution sequence is designated by manual input in step (2-3) of FIG. 5 and the distribution sequence data is generated.

In the cases of the "registered pattern" and "desired pattern" the data to be distributed are sequentially transmitted to the distant terminal units in the "communication processing system" through the "processing A" as shown in FIG. 2. Namely, a distant terminal having received the data first transmits a check signal, then analyzes sequence data and transmits the data to the next distant terminal unit. Upon completion of distribution to all distant terminal units, completion of transmission is confirmed.

Figure 30A:
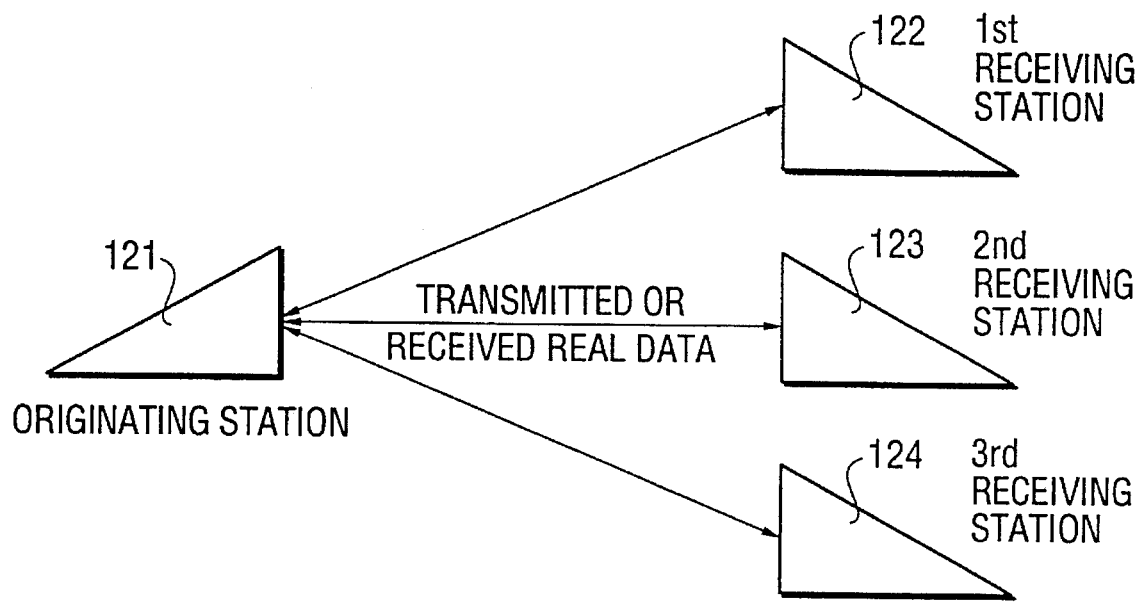
FIGS. 30(a), (b) are schematic diagrams of the prior art of distribution mode.
Figure 30B:
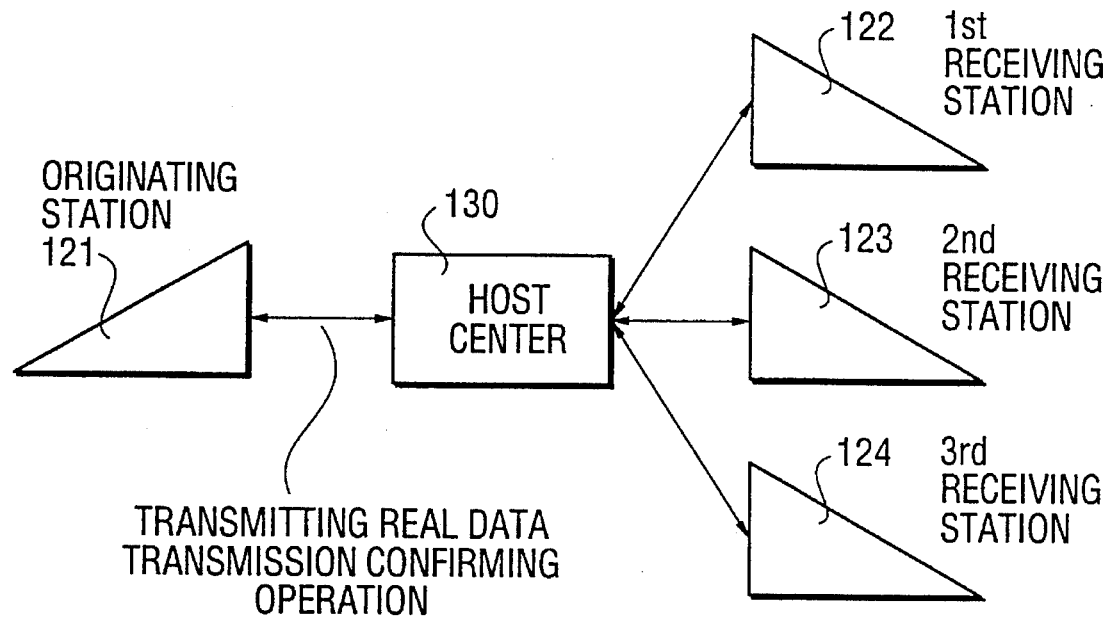

In the distribution mode of the present invention, only the data for indicating in which terminal unit the reception is carried out is returned, for example, to the transmitting station in place of returning the real data between the transmitting station and receiving station, in order to solve the problems explained with reference to FIG. 30.

Figure 11:
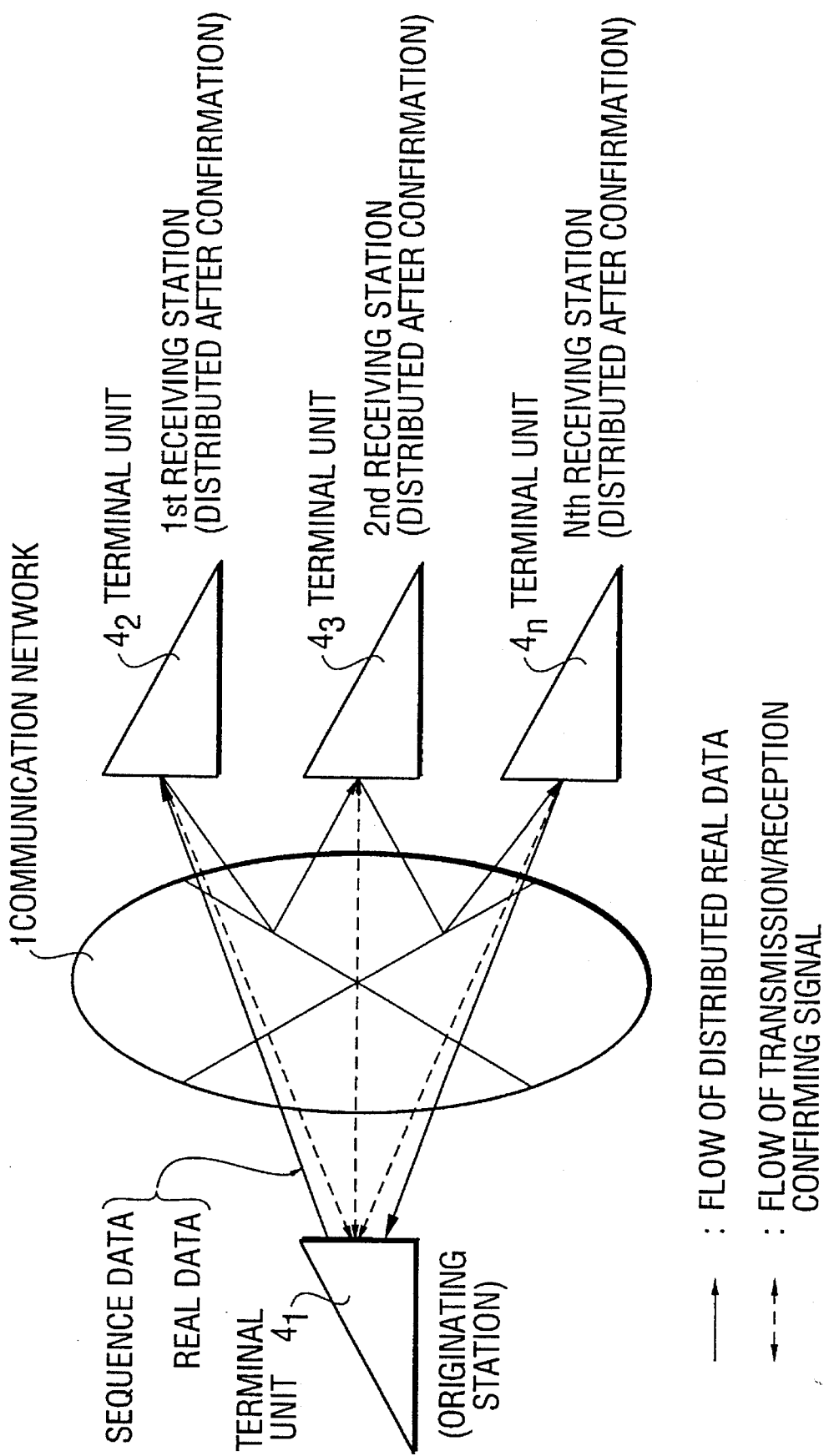
FIG. 11 is a conceptional diagram of distribution mode.

FIG. 11 indicates a conceptional diagram of the distribution mode. In this figure, the transmitting station 41 transmits the real data to be distributed and the distribution sequence data designates the distribution sequence of a plurality of receiving stations $4_2$–$4_n$ to the first receiving station $4_2$ through the communication network 1.

Thereby, the first receiving station $4_2$ sends, upon confirming initial reception, the real data to the next receiving station $4_3$ through the communication network 1 in accordance with the distribution sequence designated by the transmitting station $4_1$. The real data is then transferred between the receiving stations $4_2$–$4_n$ through the communication network 1 in accordance with the distribution sequence.

Moreover, in the present invention, when the receiving stations $4_2$–$4_n$ receive distributed real data, those stations return the reception confirming information to the transmitting station through the communication network 1 and the final receiving station returns the reception confirming information and real data.

Figure 12:
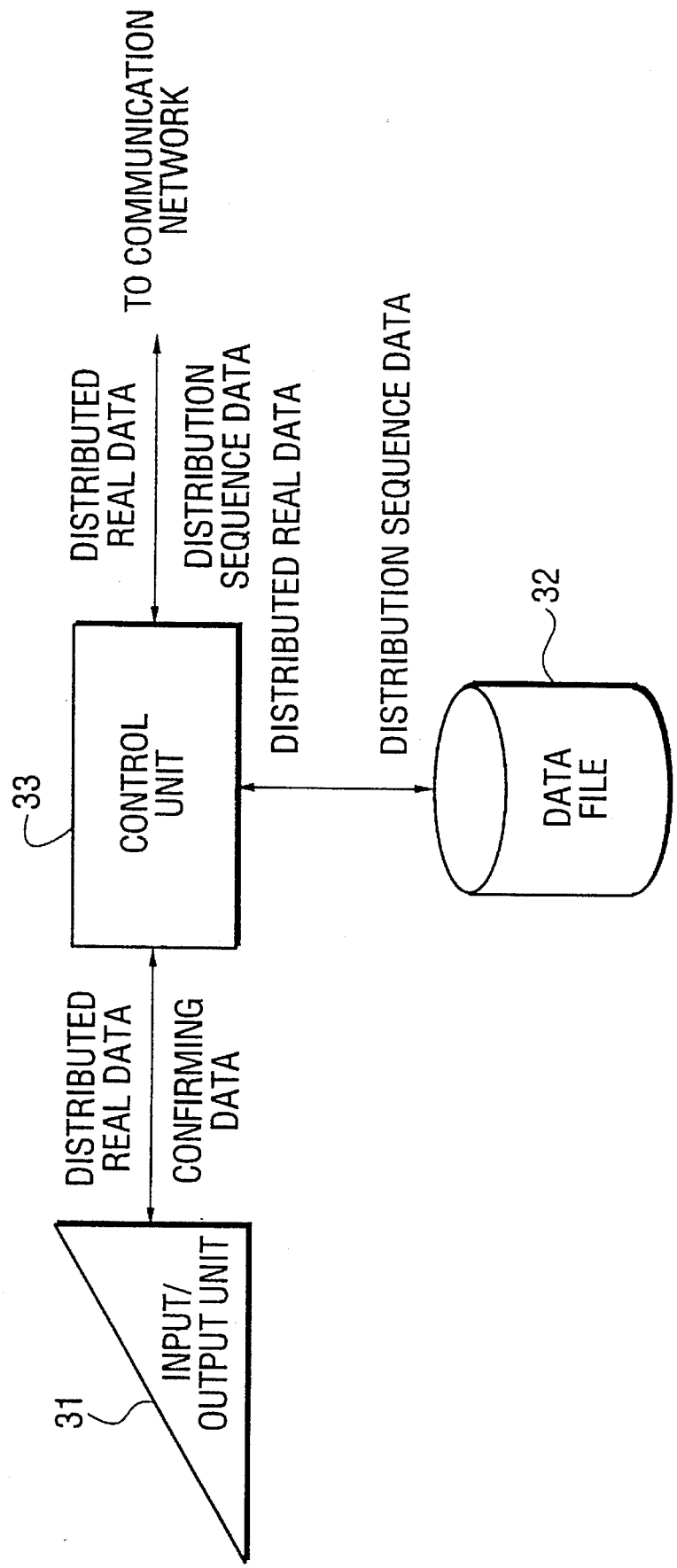
FIG. 12 is an example of structure of the terminal unit forming a distribution system.

FIG. 12 schematically shows an embodiment of a terminal unit forming the distribution system, comprising an input/output unit 31 for executing input/output operation of distributed real data and confirming termination to the transmitting station and receiving station, a file 32 for storing and outputting the distributed real data and distribution control information (distribution sequence information, confirming information) and a sequential distribution control/system control unit (input/output table) 33 for controlling input and display of the distributed real data and distribution control information for the input/output unit 31, and also controlling storage and output of distributed real data and distribution control information for the file 32 and for controlling transmission and reception of distributed real data and distribution control information for the other external terminal units through the communication network 1.

Figure 13:
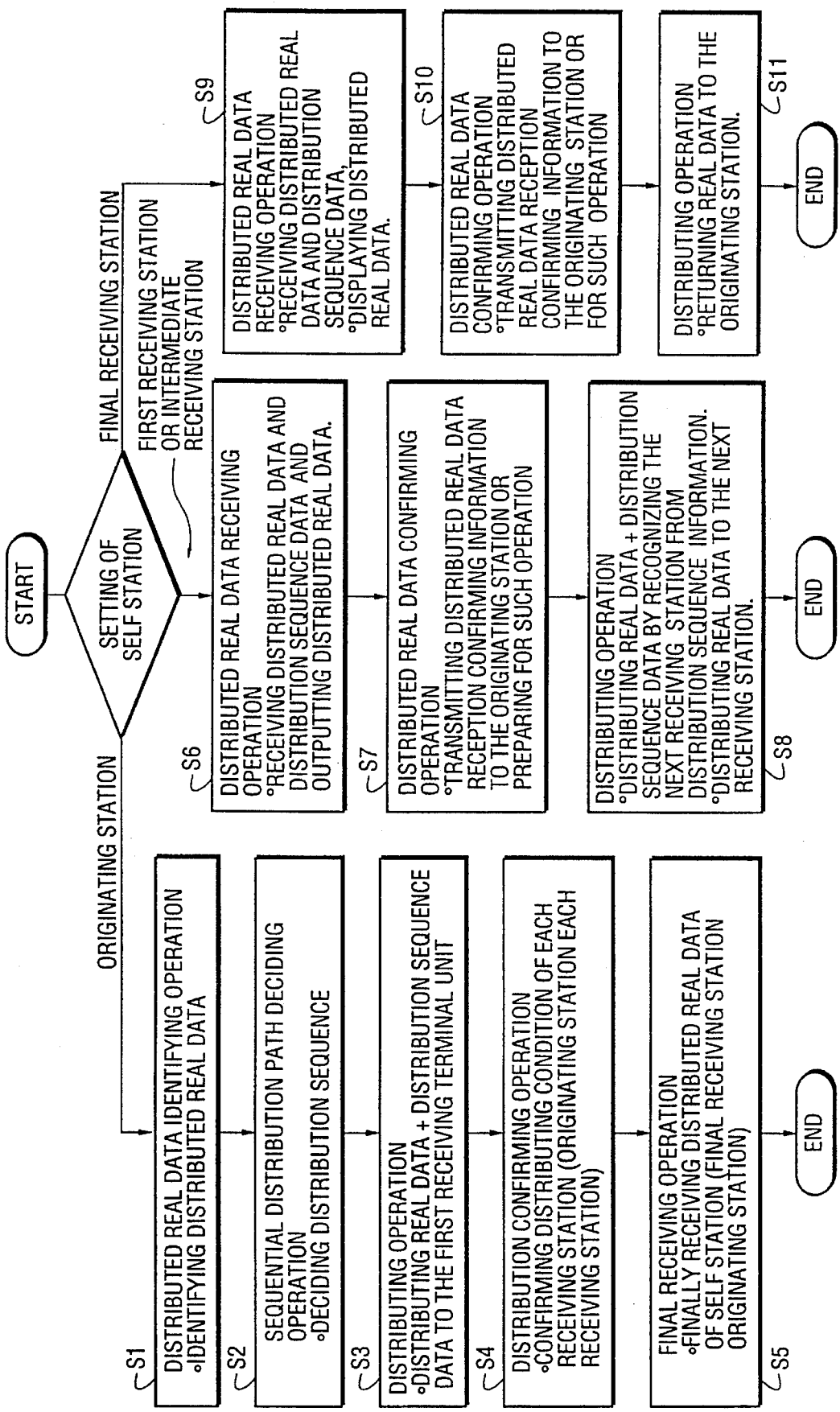
FIG. 13 is an embodiment of flow in the control part of FIG.

Next, operations of the control unit 33 shown in FIG. 12 will be explained with reference to the flowcharts shown in FIG. 11 and FIG. 13.

First, each terminal unit decides whether the self station is set to the transmitting station or the receiving station (step S0).

As a result of this decision, each terminal unit operates as follows.

In the case of transmitting station:

1: Distributed real data identifying operation (step S1).

The control unit 33 identifies the distributed real data input from the input/output unit 31 by storing it in the file 32.

2: Sequential distribution path deciding operation (step S2).

Next, the sequential distribution path information (hereinafter, referred to as distribution sequence data) is input from the input/output unit 31 and stored in the file 32.

3: Distributing operation (step S3)

The control unit 33 fetches the distributed real data and distribution sequence data from the file 32 and combines them and distributes the combined data to the first receiving station $4_2$ through the communication network 1. This distribution sequence data is given, for example as the numerical character string of terminal unit numbers in the distribution sequence and takes the form of the terminal unit number of the first receiving station $4_2$, terminal unit number of the second receiving station $4_3$ . . . terminal unit number of the nth receiving station $4_n$, and the terminal unit number of the self station (receiving station).

4: Distribution confirming operation (step S4)

The transmitting station 41 is capable of confirming the sequential distribution condition of the receiving stations $4_2$–$4_n$ with control unit 33 by a couple of following methods.

a) A method where each receiving station $4_2$–$4_n$ sends the receiving and distributing conditions to the transmitting station $4_1$ through the communication network 1 during the reception and distribution of data.

b) A method where the transmitting station $4_1$ confirms the distributing condition of each receiving station through the communication network 1.

5: Final receiving operation (step S5)

Upon completion of the confirming operation, the final receiving station $4_n$ returns the distributed real data to the transmitting station $4_1$.

In the case of receiving station (first receiving station and intermediate receiving station):

6: Distributed real data receiving operation (step S6).

The receiving station receives the distributed real data in the control unit 33 and automatically stores such data in the file 32 and outputs such data for confirmation of contents to the input/output unit 31 from the file 32 as required so that users can make reference to the distributed real data.

7: Distributed real data confirming operation (step S7)

The reception confirming information indicating that contents of distributed real data has been confirmed by the confirming job (step S6) is returned to the transmitting station $4_1$ (confirming method as explained above) or the reception confirming information is prepared and set in the queuing condition until the enquiry for confirming reception (confirming method b explained above) is received from the transmitting station $4_1$.

8: Distributing operation (step S8)

After the end of reception contents confirmation at the receiving station, data is then distributed to the next receiving station based on the sequence data.

In this case, data is transmitted through the communication network 1 in the form of the distributed real data plus the distributed sequence data, In the case of receiving station (final receiving station):

9: Distributed real data receiving operation (step S9) Same as 6 (step S6)

10: Distributed real data confirming operation (step S10) Same as 7 (step S7)

11: Distributing operation (step S11)

When the self station is decided to be the final receiving station 4 n (step SO), the real data is returned to the transmitting station $4_1$.

Whether the self station is decided to be the final receiving station or not can be discriminated from the sequence data.

When the RCS mode is selected in the processing section in FIG. 2, reference is made to the connection timing table 17 shown in FIG. 1, and the communication processing in the "communication processing system" starts as shown in FIG. 6 through the "processing A" of FIG. 3. The processings after the "communication processing system" shown in FIG. 6 correspond to the processings in such a case that intervention of a control station terminal unit is unnecessary because the distant terminal unit exists within the self group, for example, 10A in FIG. 1. The processings in a case that intervention of control station terminal unit is necessary will be explained later with reference to FIG. 8.

For example, if the terminal unit $T_1$ in FIG. 1 connects the line to the distant terminal unit $T_2$ to issue a program processing request in the "communication processing system" shown in FIG. 6, the program in the self station at the distant terminal unit $T_2$ is started and executed. When required during the processing, the data is requested. In the terminal unit $T_1$, upon reception of the request, the line to the terminal unit $T_2$ is disconnected. When an operator inputs the desired data, the line is connected again to send the data. The terminal unit $T_2$ executes the program by data input processing. Upon completion of program, the terminal unit $T_2$ notifies the end of program to the terminal unit $T_1$, and the terminal unit $T_1$ confirms that the preceding program processing request is completed. The result of processing carried out during the request program processing is sent to the terminal unit $T_1$, corresponding to notification of the end of program.

Figure 31:
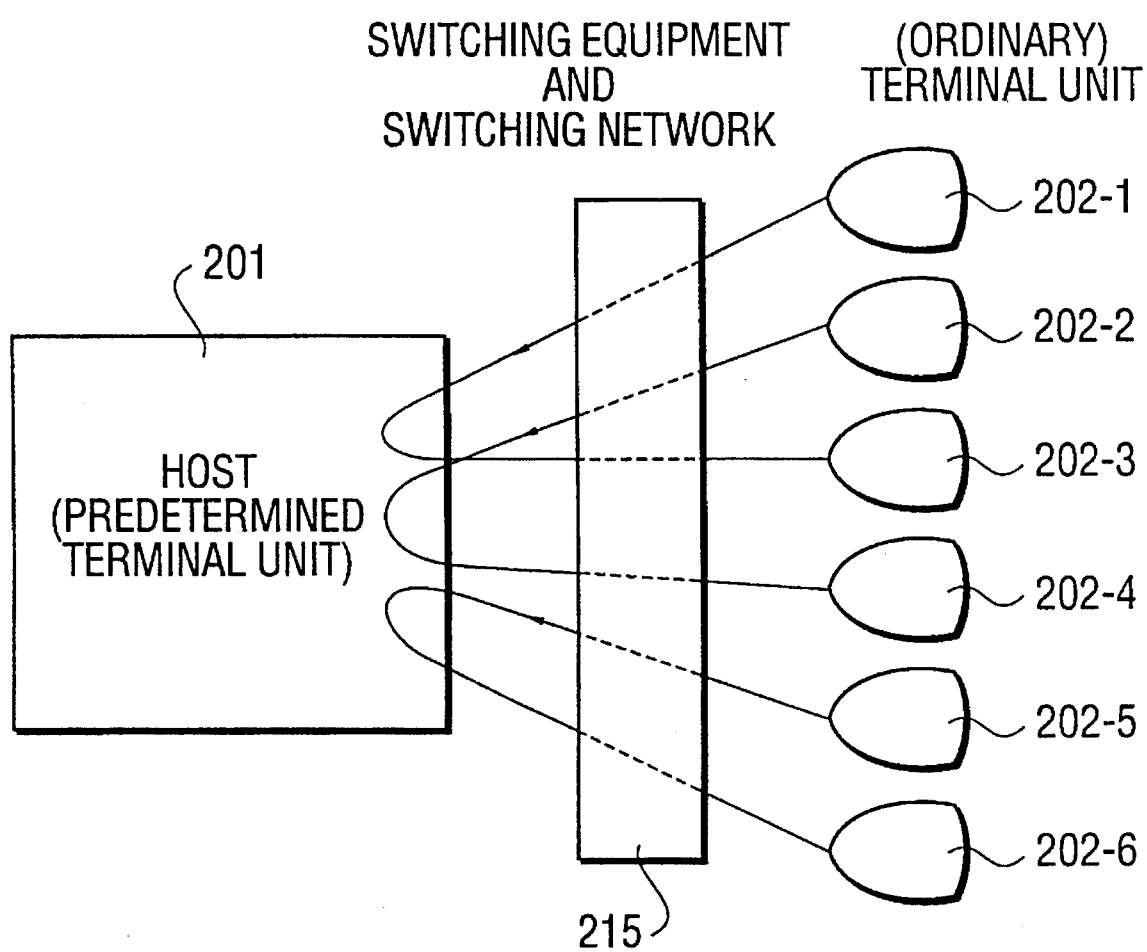
FIG. 31 is a diagram for explaining prior art RCS mode.

The RCS mode of the present invention solves the problems explained with reference to FIG. 31, namely that a load at the terminal unit operating as the host increases.

Figure 14:
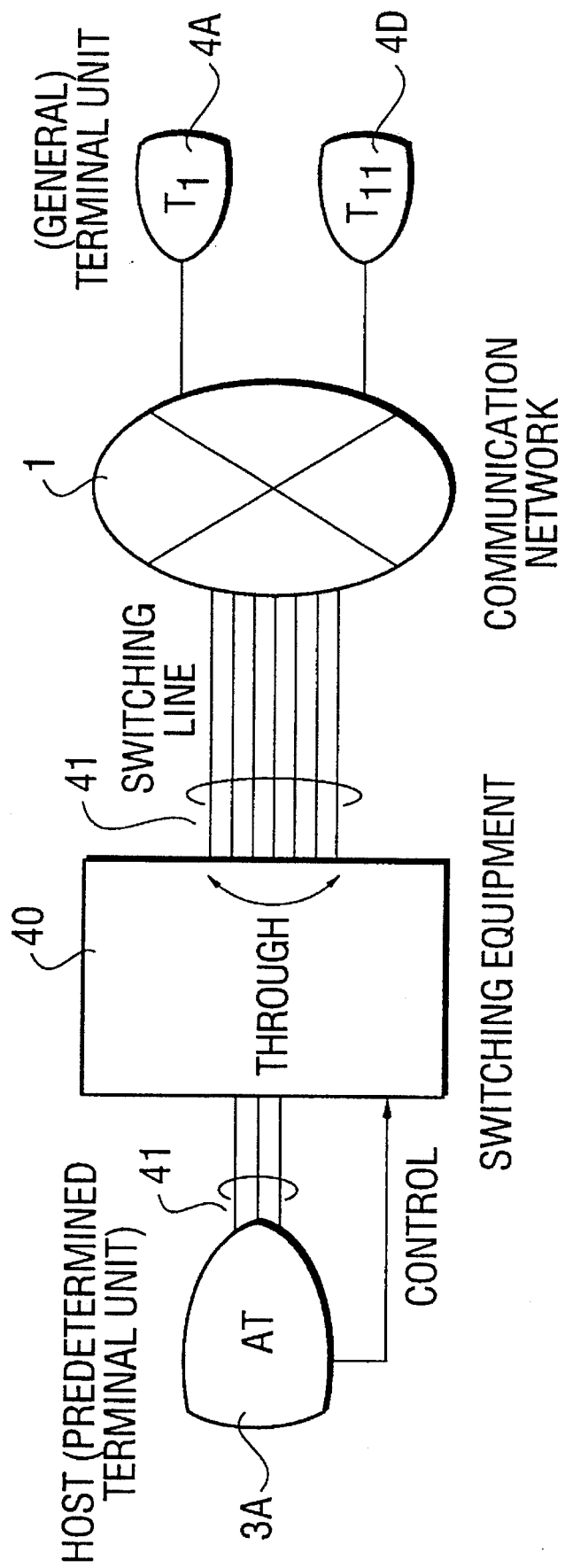
FIG. 14 is a structure for data through processing in the RCS mode.
Figure 15:
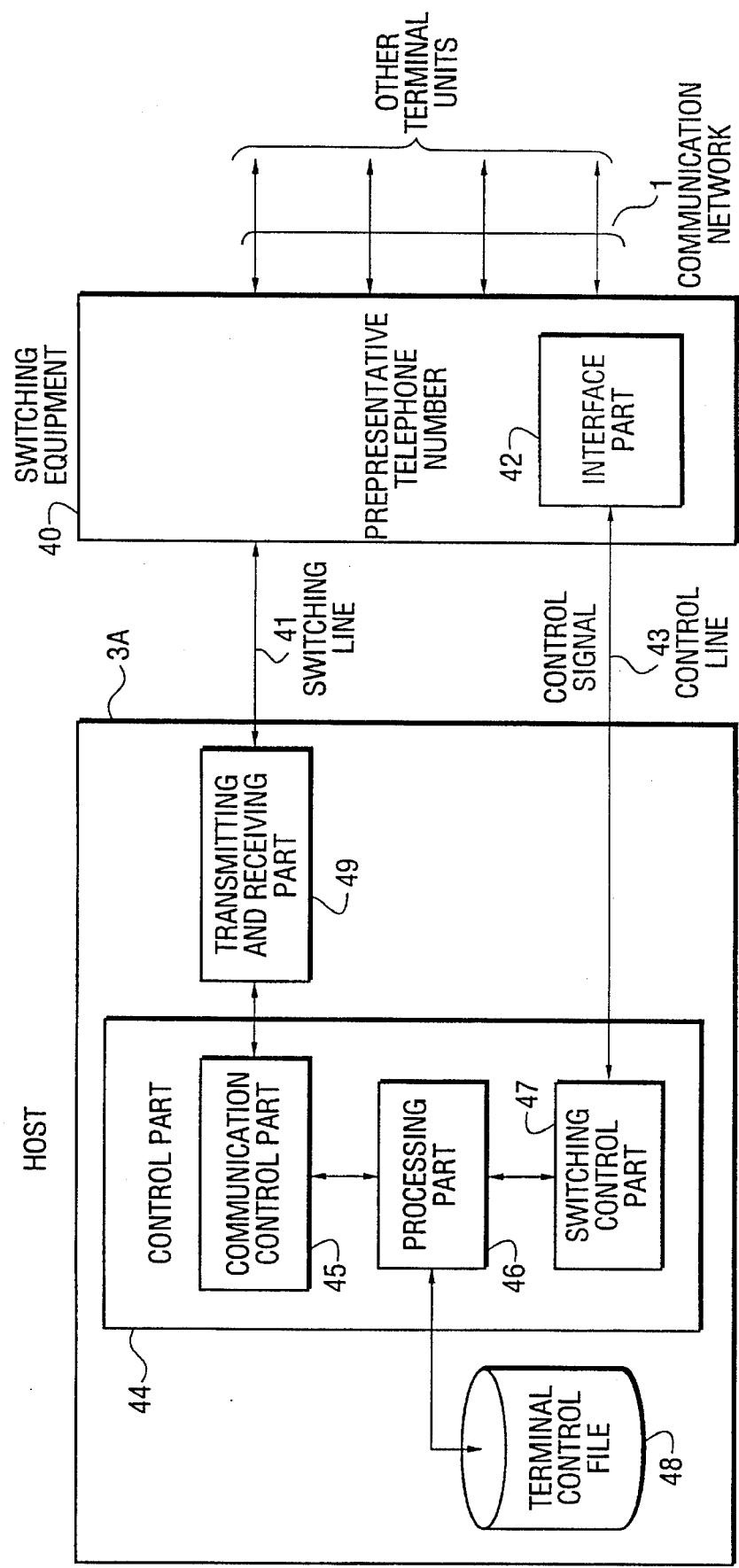
FIG. 15 is a structure of a terminal unit as the host.
Figures 1, 16:
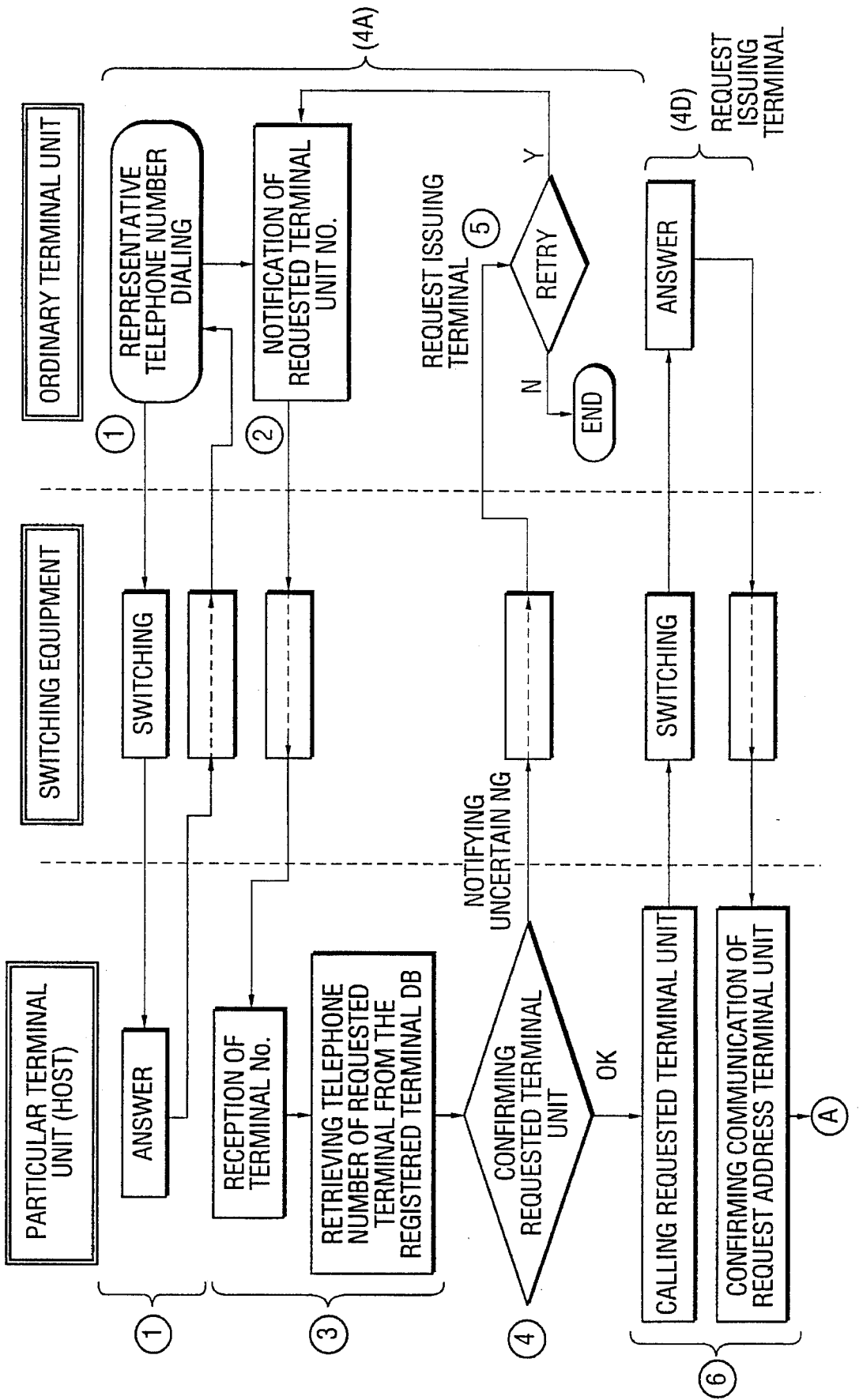
FIG. 16 is a communication flow between terminal units forming a drawing with a couple of drawings (1 and 2)
Figures 2, 16:
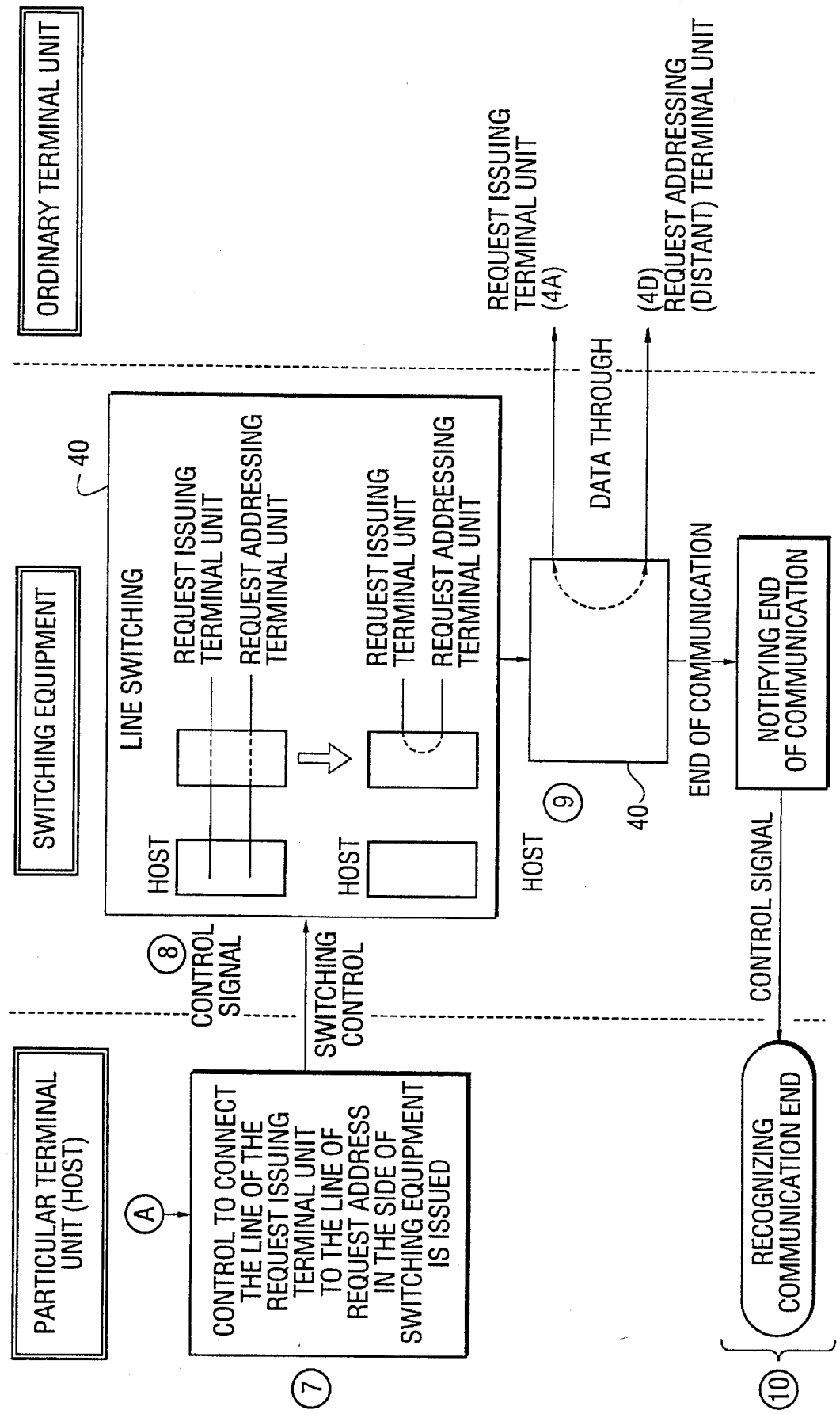

FIG. 14 shows a structure for executing the data through processing in the RCS mode and FIG. 15 shows a structure of the terminal unit operating as the host. FIG. 16 shows a flow of communication between the terminal units. FIG. 17 is a diagram for explaining the condition of communication between terminal units.

In FIG. 14, 3A is a host (predetermined terminal unit); 4 (4A, 4D), (ordinary) terminal other than the host 3A; 40, switching equipment; 1, a communication network; 41, a switching line.

The terminal unit 4 is provided with plural units and communication with data transfer is carried out between these terminal units. This communication is controlled by the host 3A. The terminal 4 is connected to the switching equipment 40 and host 3A through the communication network and switching line 41.

The host 3A is a predetermined terminal unit in the network and is a computer selected as the host for the communication with the terminal unit 4. The host 3A controls the switching equipment 40 for communication with the terminal unit 4.

The switching equipment 40 connects, as required, the host 3A and terminal unit 4 through the communication network 1 (and switching line 41). The switching equipment 40 also switches the switching line 41. Moreover, the switching equipment 40 connects the terminal unit 2 in accordance with control from the host 3A through the communication network 1 (and switching line 41). Moreover, for this purpose, the switching equipment 40 also switches the switching line 41.

Here, it is assumed that the one terminal unit 4A makes communication with the other terminal unit 4D.

The terminal unit 4A calls the host 3A through the switching equipment 40 and requests communication with the terminal unit 4D.

In accordance with this request, the host 3A calls the terminal unit 4D through the switching equipment 40 and confirms the terminal unit 4D by waiting for the response from the terminal unit 4D. The host 3A is connected with both terminals units 4A and 4D through the switching line 41 by the switching equipment 40.

Thereafter, the host 3A controls the switching equipment 40 to connect the terminal units 4A and 4D.

The switching equipment 40 connects the terminal units 4A and 4D in accordance with this control. Namely, it switches the line so that the switching line 41 from the terminal units 4A and 4D connected to the host 3A is then disconnected from the host 3A and units 4A and 4D are connected with each other. The switching equipment 40 then sends the data transmitted from the terminal unit 4A to the terminal unit 4D.

Thereby, data during the communication with the terminal unit 4 may be routed through the side of the switching equipment 40 and not the side of host 3A. Therefore, the load of host 3A can be eased and the host 3A can be used for other processings. Moreover, line control may be realized for a larger number of lines than that of the network ports of the host 3A. Thereby communication with the terminal unit 4 can be made more smooth because the restrictions on the communication resulting from the number of connecting lines and switching function can be remarkably reduced.

FIG. 15 shows a structure of the embodiment and the structure of the host 3A.

In FIG. 15, 42 is an interface part; 43, a control line; 44, a control part; 45, a communication control part; 46, a processing part; 47, a switching control part; 48, a terminal control file; 49, a transmitting and receiving part.

The host 3A comprises a control part 44 for executing the processing such as the data through control in communication with the terminal unit 4, a transmitting and receiving part 49 for making communication with the terminal unit 4 and a terminal control file 48 operating as the data base for network control.

The transmitting and receiving part 49 is a modem for converting between an electric (base band) signal and voice band signal and for transmission or reception of such signal. The transmitting and receiving part 49 is connected with the switching equipment 42 through the switching line 41o Therefore, communication between the host 3A and terminal unit 4 is carried out through the switching line 41.

The host 3A is called from a terminal unit 4 using a representative telephone number. Accordingly, the host 3A can receive a communication request from another terminal unit 4, switch the line and control data through even when it is executing transmission and reception of data with the other terminal unit. The host 3A however does not conduct data through.

Moreover, the host 3A is connected to the communication network 51 through the switching equipment 40. The terminal unit 4 is connected with the communication network 1. Therefore, the switching equipment 40 is provided between the host 3A and terminal unit 4 or communication network 1 (refer to FIG. 14). With such a structure, data through to be conducted in the host 3A can be realized smoothly by the switching equipment 40 provided in the preceding stage.

The terminal control file 48 stores the terminal unit number and telephone number of each terminal unit 4 of the network. Thereby, the host 3A is capable of controlling all terminal units 4 based on the terminal unit numbers. When the telephone number of a terminal unit 4 is changed, it is notified to the host 3A from the terminal unit 4 and the new telephone number is registered to the terminal control file 48. The terminal control file 48 is controlled by the processing part 46.

The control part 44 comprises a communication control part 45, a processing part 46 and a switching control part 47.

The communication control part 45 fetches the signal received by the transmitting/receiving part 49 to the processing part 46 and controls transmission of the signal to be transmitted from the processing part 46 to the transmitting/receiving part 49. Receiving signals include, for example, the calling and terminal number notification signals from the communication request issuing terminal unit 4A, an answer signal (for calling) from the communication request addressing terminal unit 4D, and a communication end notification signal from the switching equipment 40. The transmitting signals include, for example, the answer signal (for calling) to the communication request issuing terminal unit 4A and a calling signal to the communication request addressing terminal unit 4D.

The processing part 46 executes various signal processings for communication with the terminal unit 4 and controls the terminal control file 48 used as the data base.

Namely, when a communication request is issued from the terminal unit 4A, the processing part 46 retrieves the terminal control file 48 using a terminal unit number of the communication request address terminal unit 4D and obtains a telephone number of the communication request address terminal unit 4D and calls the communication request address terminal unit 4D. Therefore, the communication request issuing terminal unit 4A is capable of making communication with the desired terminal unit 4 only with the terminal unit number.

The processing part 46 also registers the terminal unit number 4 and telephone number of each terminal unit 4 to the terminal control file 48. If a telephone number of a terminal unit 4 changes, the processing part 46 updates the terminal control file 48.

In addition, the processing part 46 confirms the called communication request address terminal unit 4D and then requests the processing for executing the data at the switching equipment 40 to the switching control part 47.

The switching control part 47 receives a request from the processing part 46, generates a control signal for realizing data through at the switching equipment 40 and then transmits this control signal to the switching equipment 40. This transmission is carried out through a private control line 43 provided between the host 3A and switching equipment 40. Therefore, the transmitting/receiving part 49 and switching line 41 are not used. As explained above, the host 3A controls the switching equipment 40 through a control line 43 which is different from switching line 41. The switching control part 47 receives a message notifying the end of communication with the terminal unit 44 from the switching equipment 40 through the control line 43.

The switching equipment 40 is provided with an interface part 42 for making communication with the host 3A using the control line 43. The interface unit 42 carries out line switching, upon reception of control signal from the switching control part 47. Namely, under the condition that the communication request issuing terminal unit 4A and the communication request address terminal unit 4D are connected respectively to the host 3A through the switching equipment 40, connection between the switching equipment 40 and host 3A is disconnected and the two communication request issuing and address terminal units are connected in the switching equipment 40. Moreover, when communication to terminal unit 4 is completed, the interface part 42 generates a control signal for notifying communication end and transmits this control signal to the switching control part 47. Thereafter, the line to the terminal unit 4 is disconnected by the switching equipment 40.

Even when the communication with the terminal unit 4 is started, it may be disconnected by the host 3A. For instance, if the processing part 46 decides to disconnect the connection for some reason, the processing part 46 requests intermission of data through processing to the switching control part 47. The switching control part 47 generates a control signal for this purpose and then transmits this control signal to the switching equipment 40. The switching equipment 40 receives this control signal and disconnects the line executing the data through. The host 3A itself communicates with the terminal unit 4. This communication is realized through the switching line 41. FIG. 16 shows an interterminal communication flow and FIG. 17 shows a condition of interterminal communication. The communication request issuing terminal unit (terminal) is designated as 4A, while the communication request address terminal unit (terminal) is designated as 4D.

1: When the communication request issuing terminal 4A dials the representative telephone number of host 3A, the line (41) of terminal unit 4A is connected to the line (41) of host 3A by the switching equipment 40 (FIG. 17(A)). The processing part 46 of host 3A returns an answer to this calling to the terminal unit 4A through the connected line.

2: The terminal unit 4A having received this answer notifies the terminal unit number of the communication request address terminal unit 4D to the host 3A through the connected line (FIG. 17(A)).

3: Upon receipt of the terminal unit number, the processing part 46 retrieves the terminal control file 48 using such terminal unit number.

4: If the telephone number of terminal unit 4D cannot be obtained by the retrieval (the request address cannot be confirmed), the processing part 46 transmits it to the terminal unit 4A through the connected line.

5: In case a retry is not conducted at the terminal unit 4A, processing is terminated. When the retry is conducted, the processing 2 and the subsequent processings are repeated.

6: In case the telephone number of terminal unit 4D can be detected by the retrieval (request address can be confirmed), the processing part 46 calls the terminal unit 4D based on the telephone number. Accordingly, the other line (41) of the host 3A is connected (FIG. 17(B)) to the line (41) of the terminal unit 4D by the switching equipment 40. The terminal unit 4D returns the answer to the calling to the host 3A through the connected line.

Figure 17A:
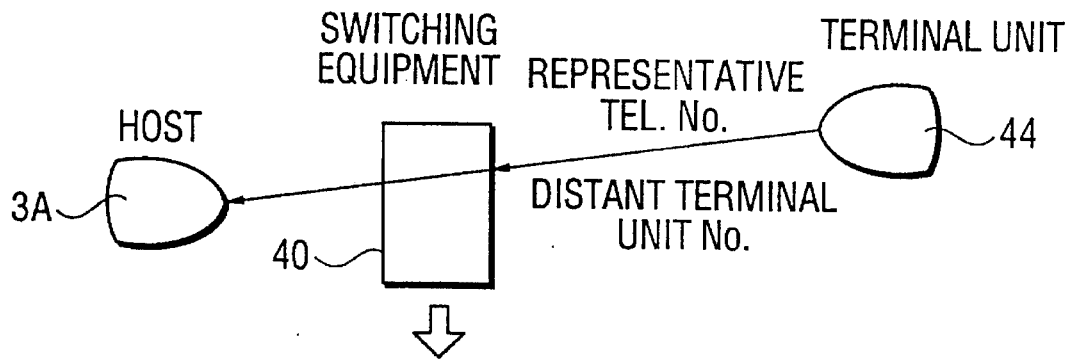
FIGS. 17(A), (B), (C), and (D) are diagrams for explaining the condition of inter-terminal communication.
Figure 17B:
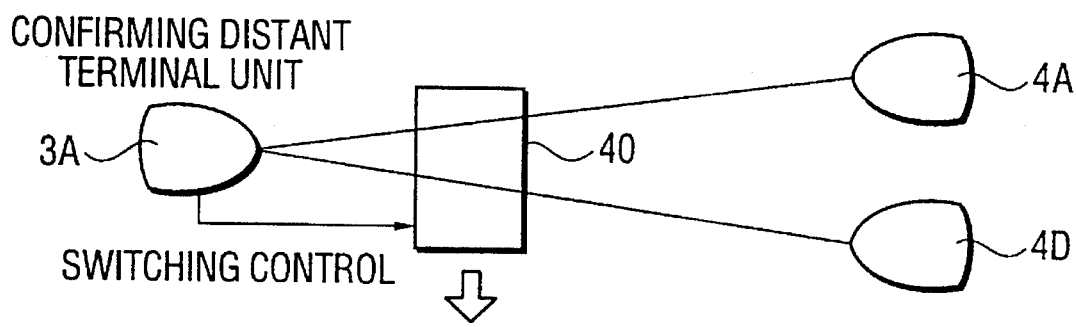
Figure 17C:
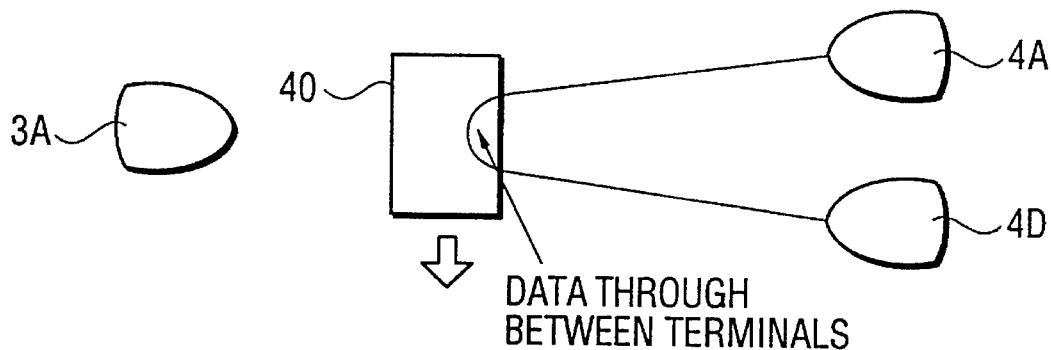
Figure 17D:
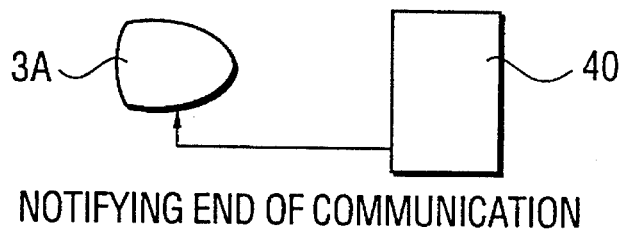

The processing part 46 of the host 3A having received the answer confirms, with this answer, that the connection is established to the request address terminal unit 4A, and hence communication is possible (FIG. 17(B)).

7: The processing part 46 requests the processing for conducting data through the switching equipment 40 to the switching control part 47.

The switching control part 47 generates the control signal for line switching and transmits this control signal to the switching equipment 40 through the control line 43 to control the switching operation (FIG. 17(B)).

8: The interface part 42 of the switching equipment 40 separates the lines (41) of the terminal units 4A and 4D connected to the host 3A and connects these lines (41) with each other (FIG. 17(C)).

9: When the terminal unit 4A transmits the data, it is sent to the terminal unit 4D through the switching equipment (FIG. 17 (c)).

10: When the communication between the terminal units 4A and 4B is terminated, the interface part 42 of the switching equipment 40 notifies the host 3A through the control line 43 (FIG. 17(D)).

The switching control part 47 of the host 3A receives this message, recognizes the end of communication and then notifies the processing part 46.

When the distant subscriber absent processing (absent registration/processing) mode is selected in the processing selection of FIG. 2, the operation flow of FIG. 7 starts. Namely, as shown in the left side of FIG. 7, "absent registration/processing start" is initiated and the processing selection is carried out. Selection may be carried out according to the following.

(i) Setting of mail reference

An absent control person sets the processing for making reference to mail which has been once registered from another terminal unit.

(ii) Registration of destination

A control person registers their own destination.

(iii) Setting of unknown destination

Destination of a control person cannot be determined and the control person is set to be notified using a pocket bell.

A processing flow in such a case that an access made to the other terminal unit from a certain terminal unit is not shown in FIG. 7, but it will be understood from the explanation below.

For the setting of a mail reference, a control person must input the keyword of the self station for the mail reference. Thereby, the keyword is registered in the keyword file (FILE 3). When the keyword input for the mail reference is matched with the intrinsic keyword (keyword on the FILE 3), reference is made to the mail for the self station.

For registration of destination of a control person, the control person sets the self destination terminal number. In this case it is confirmed by retrieving the terminal information file (FILE1) whether the preset destination terminal number corresponds to the terminal unit controlled in the system or not. When existence of a terminal unit is confirmed, the destination terminal number is registered to the variable file (FILE4). When mail is transmitted to the other terminal unit from the self control person, it is transferred using such destination terminal number.

For setting of an unknown destination, the location of the control person cannot be determined and therefore a pocket bell number is set for making contact with the control person. The relevant pocket bell number is registered to the variable file (FILE4) for later use.

An absent registration/processing mode of the present invention will be explained hereunder.

Figure 18B:
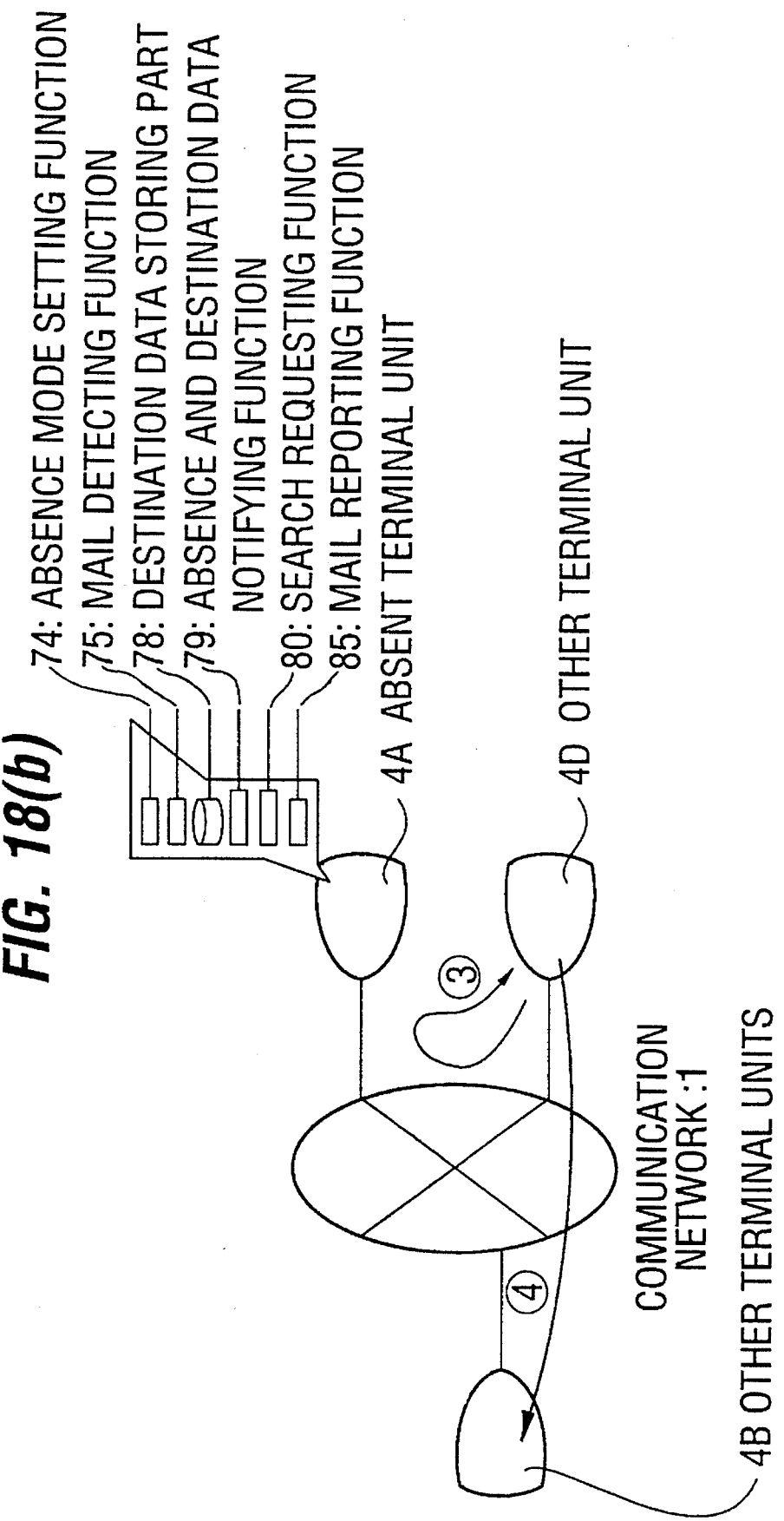
FIG. 18 (a), (b), (c) are diagrams for explaining the principle of the absent registration/processing mode.

FIGS. 18(a), (b), and (c) show diagrams for explaining the principle of the absent registration/processing mode.

In FIGS. 18(a), (b), and (c), the numeral 1 denotes a communication network, for example, a public telephone line. 3A, 4A, 4B, 4C are terminal units provided with computers. In this case, the terminal unit 4A is an absent terminal unit where a control person is absent, the terminal unit 4D sends a mail to the terminal unit 4A and terminal 4B is the destination terminal unit of the control person.

In FIG. 18(c), the terminal unit 3A functions as a pocket bell transmitter and 50 is a pocket bell of the control person.

The numeral 74 in the absent terminal unit 4A in FIGS. 18(a), (b), and (c) is the absent mode setting function which realizes various functions explained later through keying operation, for example, executed before the control person becomes absent. 75 is a mail detecting function which detects mail transmitted from the other terminal unit 4D during absent mode.

The numeral 76 in the first absent terminal unit 4A is a mail storing part which stores mail transmitted from the other terminal units 4D . . . and the terminal number and ID number of the other terminal units 4D using the terminal information (T output) file (not illustrated) of the self station 4A. 77 is an absent or mail notification function for notifying an absence of the control person to the other terminal unit 4D which has transmitted the mail, and notifies presence of already stored mail to the other terminal unit 4B which is the destination of the control person who transmitted the mail reference request. 85 is a mail reporting function to report that mail is transmitted to the self station 4A when the control person makes contact to the self station 4A from the other terminal unit 4B as the destination.

The numeral 78 in the absent terminal unit 4A is a destination data storing part for storing the terminal unit number of the other terminal unit 4B as the destination of the control person using, for example, the variable file (not illustrated) of the self station 4A. The destination data storing part 78 may be formed to store a schedule table (destinations by day and time) of the control person. 79 is an absent and destination data notification function for notifying absence of the control person and destination data to the other terminal unit 4D . . . which has transmitted the mails. 80 is search request function to request finding the location of control person by transmitting the destination data, terminal unit number of the self station 4A or terminal unit number of the other terminal unit 4D through the communication network 1, responding to the request from the other terminal unit 4D which has transmitted the mail.

Moreover, 82 in the absent terminal unit 4A is a pocket bell number storing part to store telephone number data of the pocket bell 50 carried by the control person. 83 is an absent and telephone number data notification function for notifying an absence of the control person and telephone number data to the other terminal unit 4D which has transmitted mail. 84 is a pocket bell calling function for transmitting the telephone number data to the pocket bell transmission terminal unit 3A to call the pocket bell of the control person responding to the other terminal unit 4D which has transmitted mail.

At least the following communications can be realized between the absent terminal unit 4A providing the storing parts 6, 78, 82 and functions 74, 75, 77, 79, 80, 83, 84, 85 and the other terminal unit 4D which has transmitted mail.

The other terminal unit 4D which has transmitted mail to an absent terminal unit 4A is notified that a control person is absent and stores such mail. In this case, this terminal 4D receives a message to notify the terminal unit number and ID number of the other terminal unit 4D. Accordingly, when such data is transmitted, the absent terminal unit 4A stores such mail in the mail storing part 76. Thereby, the control person can ascertain that mail has been transmitted to the self station 4A from the other terminal unit 4D and makes reference (arrow mark 2) the terminal unit number and ID number (including contents of simplified mail, as required) through the mail reporting function by issuing a mail reference request (arrow mark 1) with a particular keyword from the other terminal unit 4B as the destination of the control person.

Moreover, the other terminal unit 4D which has transmitted mail to the absent terminal unit 4A is notified that the control person is absent and also receives the destination data of control person (arrow mark 3). Thereby, the other terminal unit 4D which has transmitted mail can detect the other terminal unit 4B as the destination of control person and then transmits mail to such terminal unit 4B for making communication with the relevant control person (arrow mark 4).

Moreover, the other terminal unit 4D which has transmitted mail to an absent terminal unit 4A is notified that the control person is absent and transmits the telephone number of the pocket bell 50 of the control person (arrow mark 5). As explained later, it may be possible to ask for calling to the pocket bell transmitter terminal unit 3A by the absent terminal unit 4A, without sending the telephone number of the pocket bell 50 to the other terminal unit 4D. Thereby, when the other terminal unit 4D which has transmitted the mail asks (arrow mark 6) for transmission by the pocket bell transmission terminal unit 3A by sending the telephone number data, the pocket bell 50 of the control person is called (arrow mark 7). Accordingly, the control person can make reference to the simplified mail content, terminal unit number and ID number of the main mail already received and may also communicate with the other terminal unit 4D having transmitted the mail previously (arrow mark 10) by making contact with the self station 4A from the other terminal unit 4B as the destination and may make a mail reference request, etc.

Figure 19:
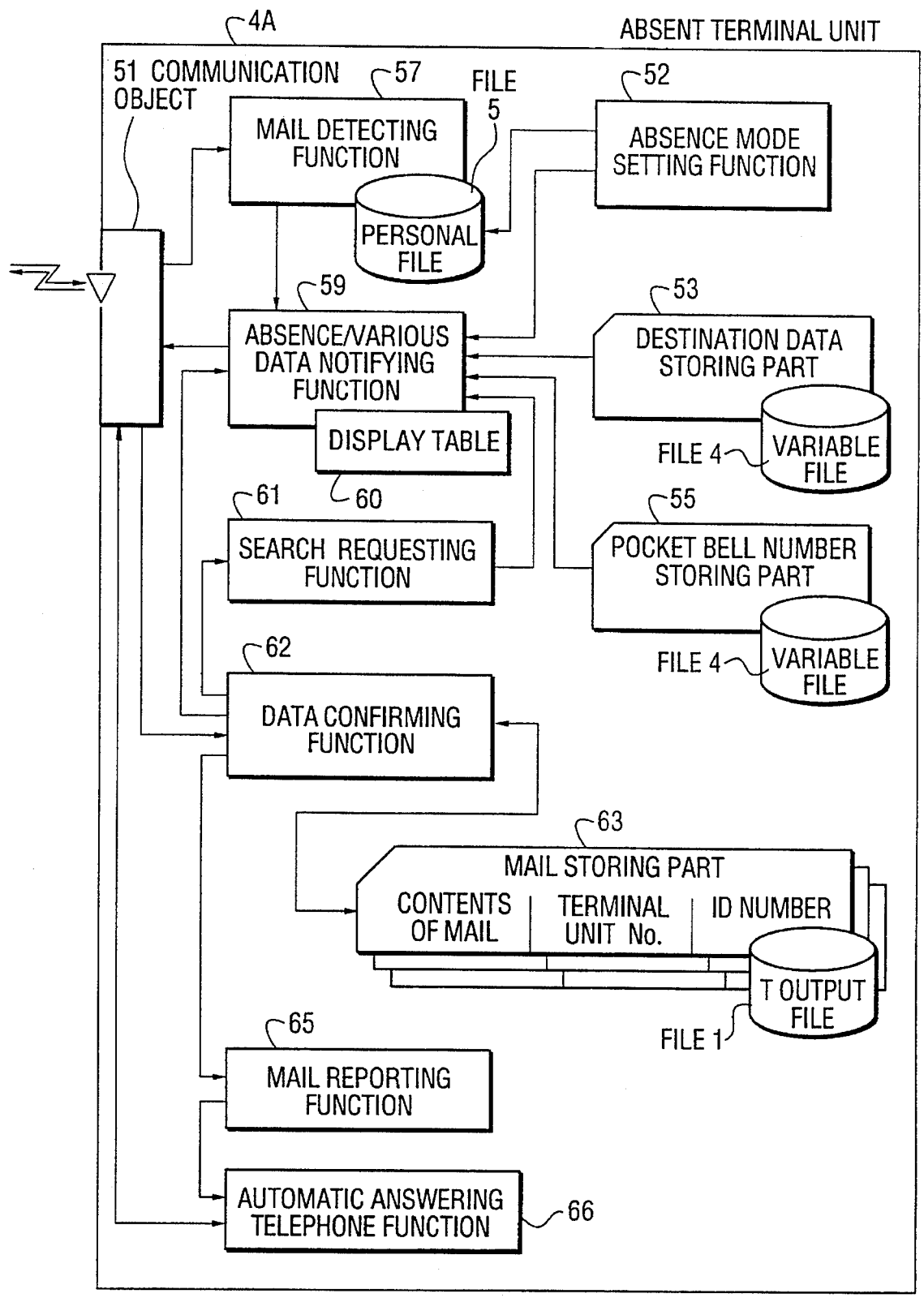
FIG. 19 is a diagram indicating the principal structure of the absent terminal unit.

FIG. 19 shows a structure of the essential portion of an absent terminal unit.

4A is an absent terminal unit. 51 is a communication object; 52, an absent mode setting function; 53, a destination data storing part; 55, a pocket bell number storing part; 57, a mail detecting function; 59, an absence or various data (e.g. permission or not for mail storing, destination data, pocket bell number data, search request data and stored mail data, etc.) notification function; 61, a search requesting function; 62, a data confirming function; 63, a mail storing part; 65, a mail reporting function; 66, an automatic answering function. FILE1, FILE4, FILE5 are respectively files; 60, a display table.

Regarding the absent mode setting function 52, when a plurality of terminal units (computers) are connected to the self station 4A, the relevant self terminal unit is set as the "absent terminal" in the personal FILE5 where existence/absence of each terminal unit is registered. In the case only one terminal unit (computer) is provided, a flip-flop, for example, may be used.

Regarding the destination data storing part 53, a variable file FILE4 in the self station 4A is used and the terminal unit number of the other terminal unit 4B as the destination of control person is stored. An action schedule of the control person, namely the schedule table including the time and terminal unit number as the destination, is also stored.

Regarding the pocket bell number storing part 55, the variable file FILE4 in the self station 4A is used and the telephone number data of pocket bell 50 of the control person (hereinafter referred to as the pocket bell number data) is stored.

The mail detecting function 57 is formed using, for example, a gate and when mail is transmitted from the other terminal units 4B, 4D, . . . during the absence mode, mail transmission is detected. When mail is detected, the absence and various data notification function 59 operates after determining whether the relevant terminal is absent or not by retrieving the personal file FILE 5.

Regarding the absence and various data notification function 59, a display table 60 for displaying various data is set as required for the display of the distant terminal unit (not illustrated) and it is notified to distant terminal units, namely the other terminal units 4B, 4D, . . . which have transmitted mail through the communication object 51. Various data include an absence data notified when the mail is received. Moreover, this data indicates that, first, the control person is now absent; second, whether the relevant mail content is stored therein or not; third, it is confirmed that it is requested to know the destination of control person; or telephone number of pocket bell 50; fourth, it is confirmed that an operator at the attendant board desires to search for the control person; and fifth, the terminal unit number and ID number and name of the distant terminal unit (in this case terminal units 4B, 4D, . . . ) should be transmitted when any one or all of the second, third, fourth conditions are satisfied.

Moreover, various data include the data which corresponds to the fourth data explained above which receives the terminal unit number and ID number from the distant terminal unit and is then notified after it is confirmed by the data confirming function 62. This data represents destination data stored in the destination data storing part 53 or pocket bell number data stored in the pocket bell number storing part 55, or both.

The search asking function 61 requests a search for the control person to an operator of the switching network. This function transmits the control person search requesting data, destination data or pocket bell number data and the self terminal unit number and terminal unit number having transmitted the mail through the absence and various data notification function 59.

The search asking function 61 operation as explained above is performed when it is confirmed by the data confirming function 62 explained later that the terminal number and ID number of the other terminal units 4B, 4D, . . . having transmitted the mail become apparent.

Regarding the data confirming function 62, the kinds of data transmitted from the other terminal units 4B, 4D . . . can be discriminated. More particularly, the data in relation to the terminal unit number and ID number transmitted from the other terminal units 4D . . . which have transmitted the mail and data representing an answer from the other terminal unit 4D . . . and related to a mail storing request, a destination data transfer request, a pocket bell number data transfer request or a search asking request may be discriminated. Upon confirmation of these data, if related to the terminal number and ID number, data and content of relevant mail are stored in the mail storing part 63 and informed to the mail reporting function 65 later. Meanwhile, it is instructed which data should be notified to the absence and various data function 59.

It is also confirmed when the control person has transmitted the mail reference request with a particular keyword; from the other terminal unit, for example 4B, as the destination (not illustrated). In this case, the mail and data such as other terminal unit number and ID number stored in the mail storing part 63 explained later are transmitted to the other terminal units, 4B, 4D as the destination.

Regarding the mail storing part 63, the T output file FILE1 in the self station 4A, for example, is used and the mail from the other terminal unit, for example, 4D (not illustrated) and terminal unit number and ID number, and name are stored therein.

Regarding the mail reporting function 65, when a control person makes contact with the automatic answering function 66 of the telephone set (not illustrated) of the self station 4A, for example, from a public telephone set (not illustrated) at the destination, music, for example, is output to the automatic answering function 66 in order to indicate termination of mail.

Figure 20:
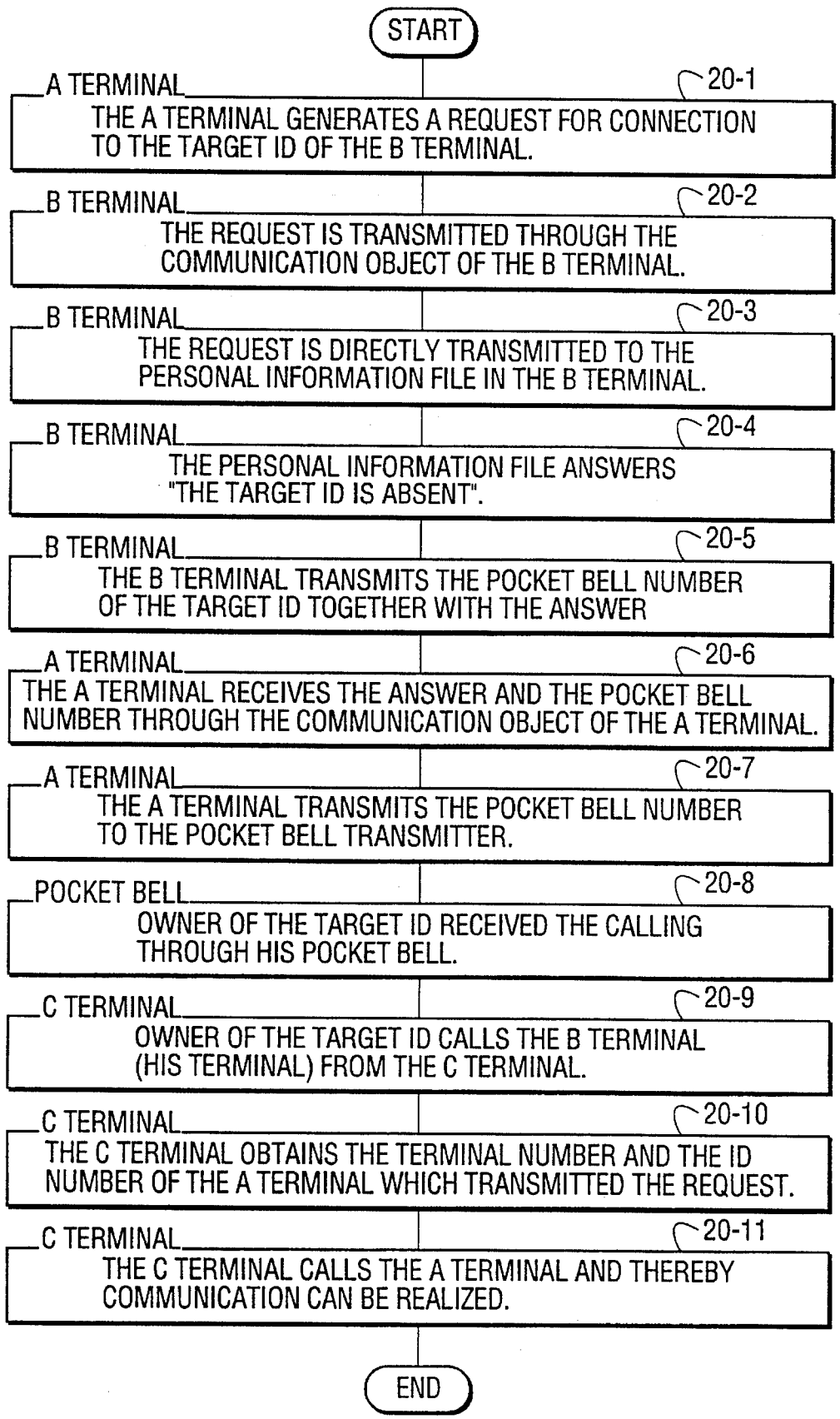
FIG. 20 is a flowchart indicating an example of the absent registration/processing operation.

FIG. 20 is a flowchart indicating an example of the absence registration/processing operation. The flowchart indicates that the other terminal unit 4D which has transmitted the mail obtains the pocket bell number.

Moreover, the side having transmitted the mail is defined as the A terminal unit 4D, the side where the control person is absent is defined as the B terminal unit 4A, and the side representing the destination of control person as the C terminal unit 4B.

When the target ID request at the B terminal unit 4A is generated in the A terminal unit 4D in step 20-1, this request is transmitted to the communication object 51 of the B terminal unit 4A in step 20-2.

Under this condition, the relevant request data is transferred to the personal information file (or personal file) FILE5 in step 20-3. Thereafter, the personal information file FILE4 sends the answer "No target ID" indicating that the control person is absent in the step 20-4. The target ID, namely the pocket bell number data of control person is transmitted together with such answer in step 20-5.

Under this condition, the A terminal unit 4D receives, in step 20-6, the previous answer and the information about pocket bell number data through the communication object of self station 4D. Thereby, the terminal unit 4D sends the pocket bell number to the pocket bell transmitting terminal unit 3A in the switching network (not illustrated) in step 20-7.

When a control person can be located and called, the target ID receives the "calling" condition with the pocket bell 50 of the control person in step 20-8. Subsequently, the control person having the pocket bell with the target ID, namely the control person of the B terminal unit 4A calls the B terminal unit 4A (self terminal unit) from the C terminal unit 4B as the destination in step 20-9. Thereafter, the control person obtains the terminal unit number and request issuing ID number at the C terminal unit 4B from the B terminal unit 4A in the step 20-10.

Thereby, the control person calls the A terminal unit 4A from the C terminal unit 4B in step 20-11. Thereby, terminal unit 4A is capable of making communication with the C terminal unit 4B as the destination of the control person.

Accordingly, in the present embodiment, the B terminal unit 4A when the control person is absent can make communication with the A terminal unit 4A which has transmitted the mail because communication with the control person is possible using the pocket bell number data. Thereby, the A terminal unit 4A having received contact from the C terminal unit 4B as the destination of the control person is now capable of informing the request, for example, that it desires to borrow a program or to store data in the B terminal unit 4A therefrom.

In this case, the control person is now capable of making desired communication with the A terminal unit 4D at the B terminal unit 4A by executing the remote control operation to the B terminal unit 4A.

Here, it is of course allowed in the flowchart of FIG. 20 to send the data to issue the search request or not to the schedule table of the control person or operator in step 20-5 and to form the storing parts 53, 55, 63 with the same file.

The communication processings corresponding to the chat have been explained with reference to FIG. 3, message distribution (mail) explained with reference to FIG. 4 and FIG. 5 and RCS (remote computer service) explained with reference to FIG. 6.

Figure 29:
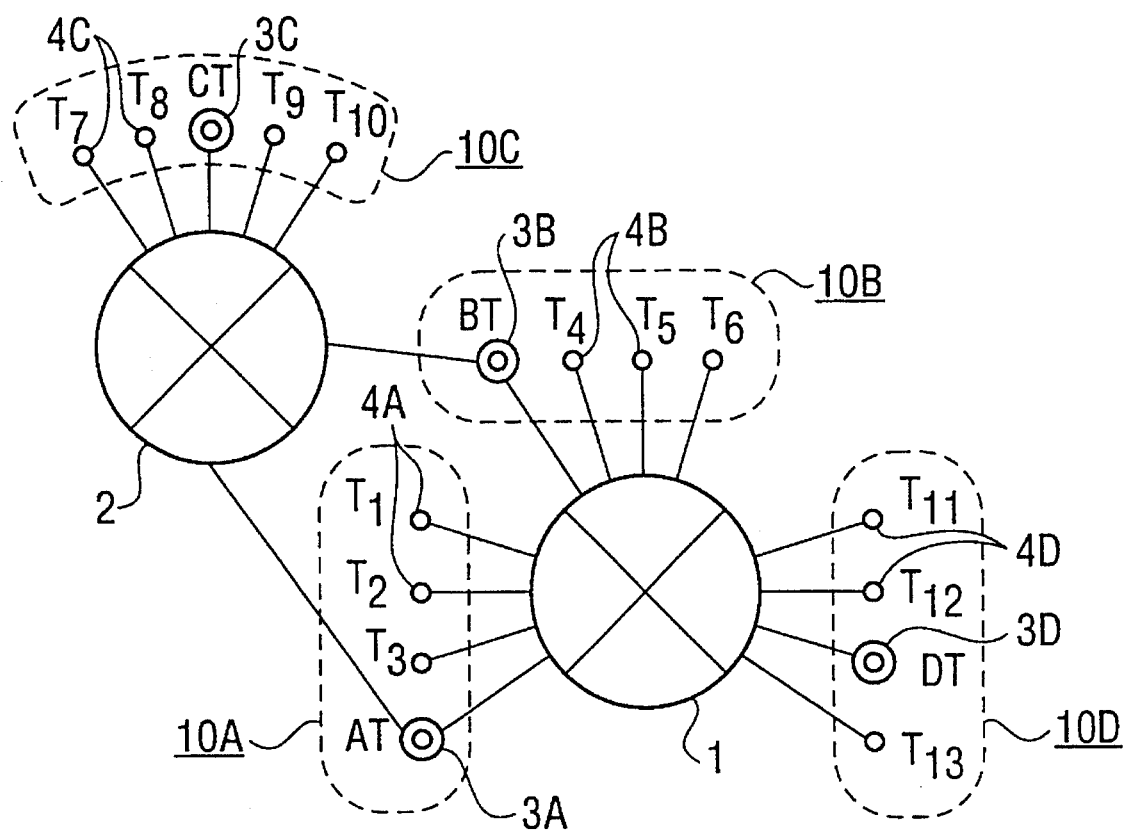
FIG. 29 is an example of the network.

The communication processing system explained with reference to FIG. 3 to FIG. 6 is based on one to one communication. However, the communication network has grown increasingly more complicated as explained with reference to FIG. 29 and a public network or private network may also be used. Communication cost therefore increases or decreases depending on the way the communication network is used.

An effective communication control system in a communication network mixing the public network and private lines will be explained hereunder.

Figure 21:
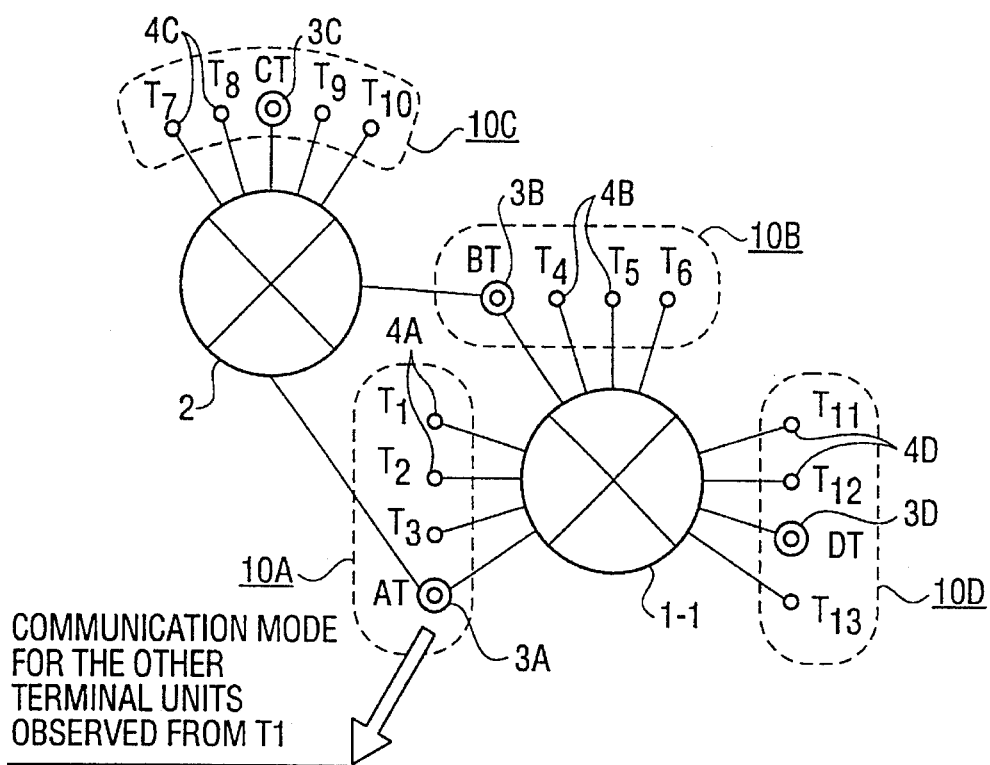
FIG. 21 is a diagram for explaining a communication control system.

FIG. 21 is a diagram for explaining a communication control system. In this figure, 1-1 is a public network; 2, a private line; 10A, 10B, 10C, 10D, terminal groups; 3A, 3B, 3C, 3D, control station terminal units; 4A, 4B, 4C, 4D, ordinary terminal units.

The terminals 3, 4 are sorted into the groups 10A, 10B . . . because they are connected with the same communication network and are regionally closed.

Each group is provided with at least one control station terminal unit 3A, 3B, . . . having an extracting function 11Ti and notification function 12-1Ti. For instance, regarding the extracting function 11A in the control station terminal unit 3A, the terminal information can be received by (i) storing it on the memory for the terminal units (3A,4A) belonging at least to the self group 10A, and (ii) holding it in the memory or making enquiry to the corresponding control station terminal units 3B, 3C, ... for the terminal units (3B, 4B, 3C, 4C, ...) belonging to the other groups 10B, 10C .... The terminal information includes:

(i) T-No.: A terminal unit ID.

(ii) Group name: The group name in relation to the control station terminal unit is described by the control station terminal unit ID.

(iii) Type: Network to be connected is described by the network ID.

(iv) Communication mode: Communication mode to be connected with the connection mode.

Moreover, the notification function 12-1A notifies such terminal information to a terminal unit ($T_1$) responding to the enquiry, for example, from the terminal unit ($T_1$).

The ordinary terminal unit 4 and each control station terminal unit 3 are provided with the communication mode deciding function 12-2. The relevant communication mode deciding function 12-2 decides the communication mode for connecting an originating call by an operator of the self terminal unit or an originating call transferred from the other terminal unit and adopts the necessary processing mode (automatically determined for the originated call).

For example, when the terminal unit ($T_1$) indicated in the figure makes communication with the terminal unit ($T_2$), an operator of the terminal unit ($T_1$) knows the desired communication mode and makes communication directly with the terminal unit ($T_2$).

Moreover, when the terminal unit ($T_1$) makes communication with the terminal unit ($T_4$), it is realized by using the control terminal unit (BT) 3B from the control terminal unit (AT) 3A through the private line 2.

In case the terminal unit ($T_1$) makes communication with the terminal unit ($T_4$), communication is made through the control terminal unit (AT) 3A.

Moreover, when the terminal unit ($T_1$) makes communication with the terminal unit ($T_{11}$), it first makes communication to the control station terminal unit (DT) 3D and it is transferred to the terminal unit ($T_{11}$).

In addition, when the terminal unit ($T_1$) makes communication to the terminal units ($T_{11}$) and ($T_{12}$) for the same communication, the terminal unit ($T_1$) makes communication to the control station terminal unit (DT) 3D and then it is transferred to the terminal units ($T_{11}$) and ($T_{12}$) from the terminal unit (DT).

Figure 22:
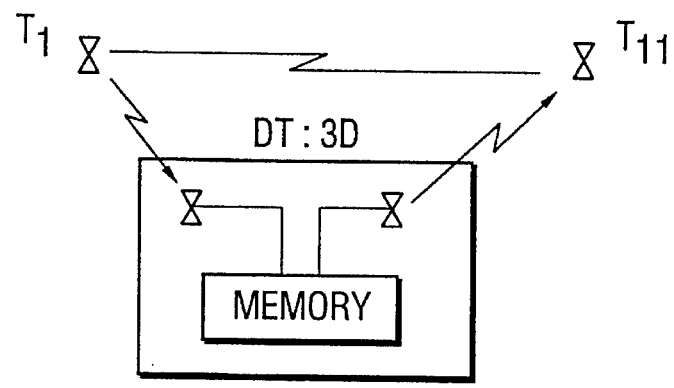
FIG. 22 to FIG. 26 show communication modes in the present invention.

FIG. 22 shows a first communication mode in the present invention. When the terminal unit ($T_1$) makes communication with the terminal unit ($T_{11}$), the communication cost for direct communication from the terminal unit ($T_1$) to terminal unit ($T_{11}$) becomes lower, in some cases, than the sum of the communication cost to the control station terminal unit (DT) 3D from the terminal unit ($T_1$) and the communication cost to the terminal unit ($T_{11}$) from the control station terminal unit (DT) 3D. In this case, "through DT" is extracted as the communication mode in the extracting function 11A shown in FIG. 21.

Figure 23:
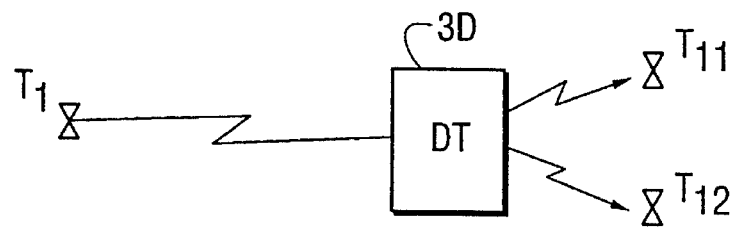

FIG. 23 shows a second communication mode in the present invention. When the terminal unit ($T_1$) makes communication with the terminal units ($T_{11}$) and ($T_{12}$) in distant areas for the same data, the remote communications are conducted respectively for terminal units but as shown in FIG. 23, where communication is made to the control station terminal unit (DT) 3D and then it is transferred to the terminal units ($T_{11}$) and ($T_{12}$).

Figure 24:
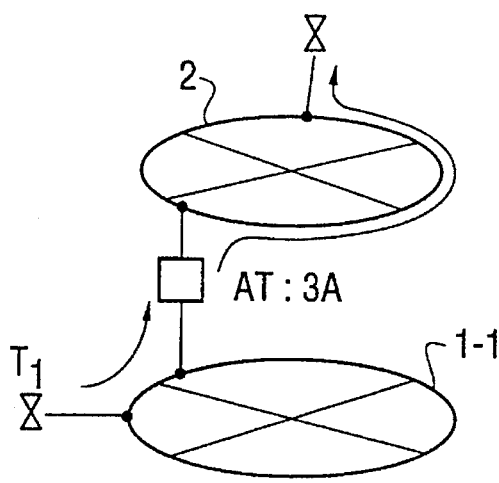

FIG. 24 shows a third communication mode in the present invention. When a private line is used for communication from the terminal unit ($T_1$), the private line is used through the control station terminal unit (AT) 3A nearest to the terminal unit ($T_1$). Here, it is assumed that the control station terminal unit (AT) 3A is connected to the public network 1-1 and private line 2. In this case, "through AT" is extracted as shown in FIG. 21 as the communication mode.

Figure 25:
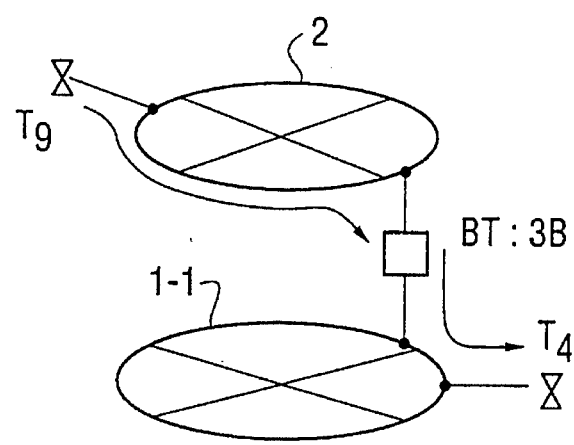

FIG. 25 shows a fourth communication mode in the present invention. When a terminal unit is on the private line, for example, the terminal unit ($T_9$) makes communication to the terminal unit ($T_4$), and communication is made through the control station terminal unit (BT) 3B nearest to the terminal unit ($T_4$). Here, it is assumed that the control station terminal unit (BT) 3B is connected to the public network 1-1 and private line 2. In the extracting function 11i as shown in FIG. 21, the extracting function 11C (not illustrated) at the control station terminal unit (CT) 3C extracts "through private line" as the communication mode.

Figure 26:
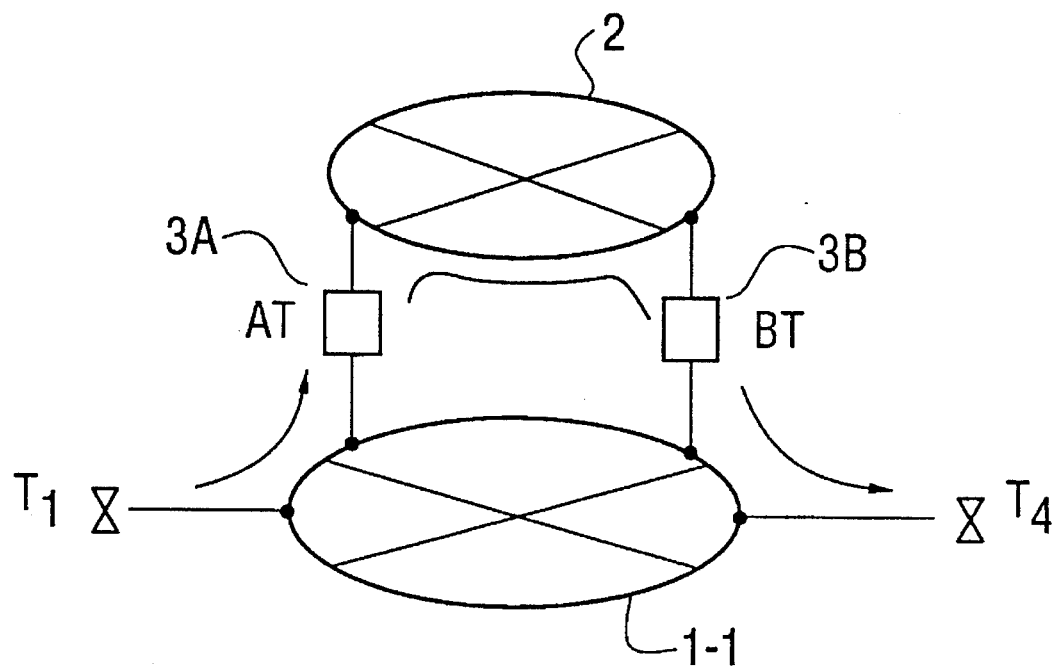

FIG. 26 shows a sixth communication mode in the present invention. When the terminal unit ($T_1$) makes communication with the terminal unit ($T_4$), if it is assumed that the private line is effectively used, communication is first made to the control station terminal unit (AT) 3A from the terminal unit ($T_1$), the communication is made to the control station terminal unit (BT) 3B from the terminal unit ($T_1$), and then communication is made to the control station terminal unit (BT) 3B on the private line 2 and it is then transferred to the terminal unit ($T_4$). The extracting function 11A shown in FIG. 21 extracts "through private line" as the communication mode.

Figure 27:
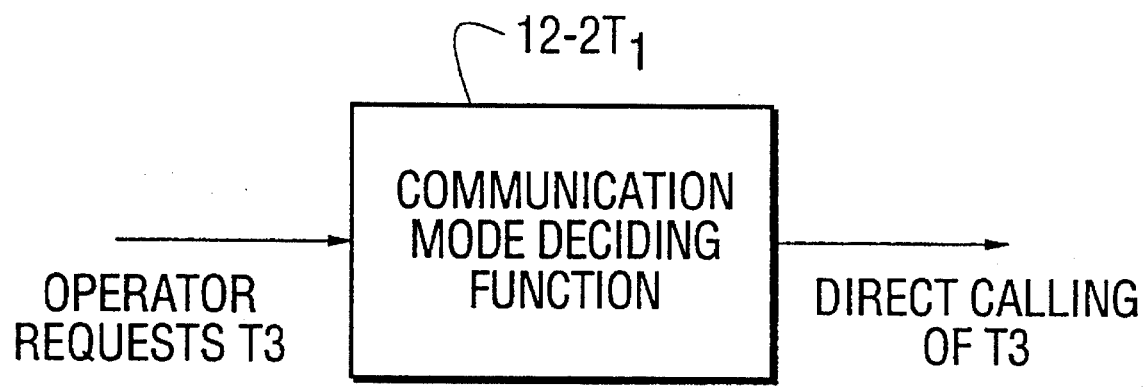
FIG. 27 is a processing profile in direct communication.

FIG. 27 shows a processing mode in direct communication.

When the terminal unit ($T_1$) shown in FIG. 21 makes communication with the terminal unit ($T_3$), if an operator of the terminal unit ($T_1$) issues a communication request to the terminal unit ($T_3$), the communication mode deciding function 12-2$T_1$ at the terminal unit ($T_1$) calls the terminal unit ($T_3$) to establish direct connection by (i) the information designated by the operator of the terminal unit ($T_1$) or by (ii) receiving "communication mode" corresponding to the terminal unit ($T_3$) in the terminal unit information sent from the control station terminal unit (AT) 3A.

Figure 28:
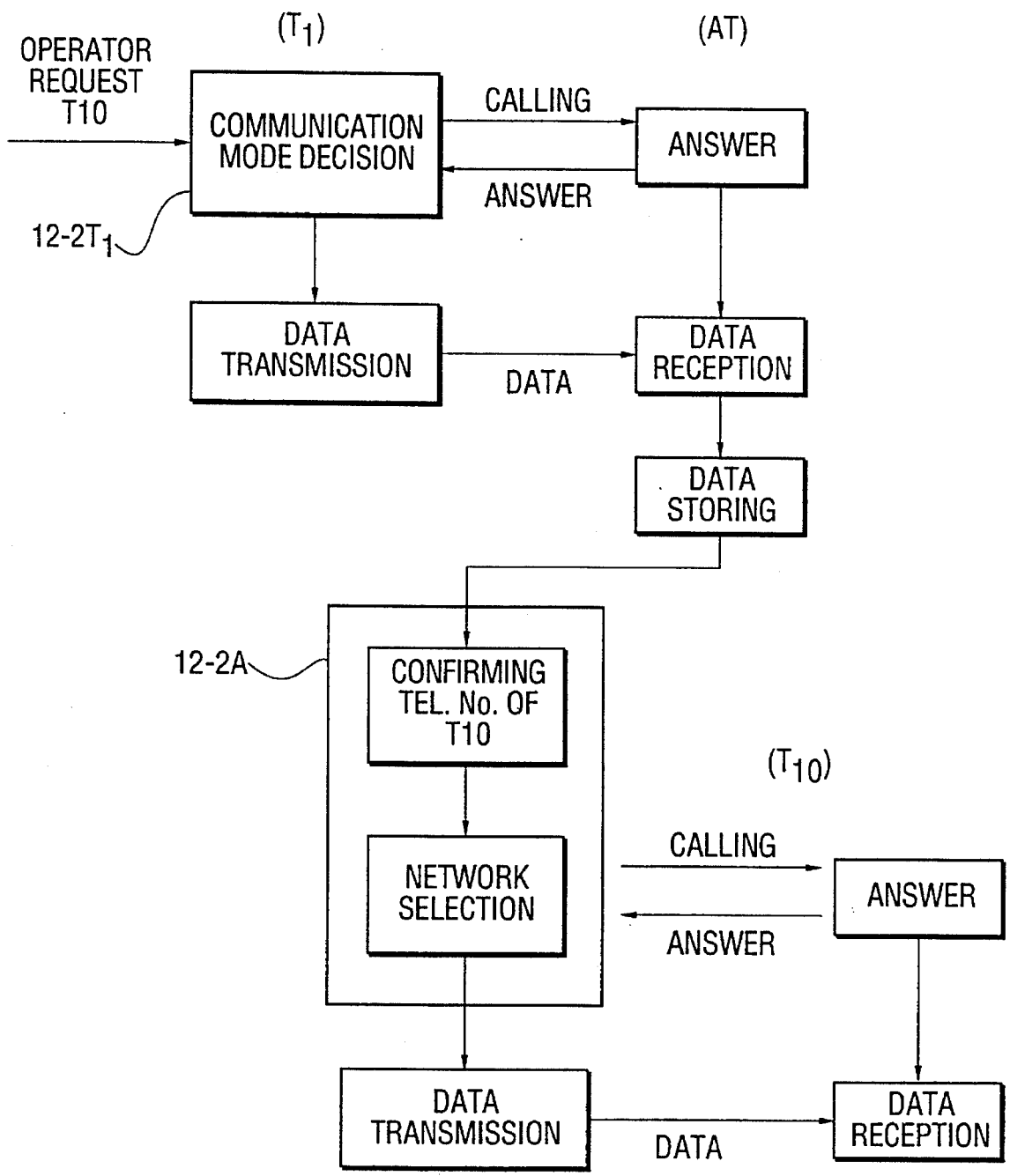
FIG. 28 is a processing profile for communication through the control unit as the control station.

FIG. 28 shows a processing mode for the communication to be made through the control station terminal unit. In this figure, it is assumed that the terminal unit ($T_1$) makes communication with the terminal unit ($T_{10}$) through a private line.

If an operator issues a communication request to the terminal unit ($T_{10}$), the communication mode deciding function 12-2$T_1$, at the terminal unit ($T_1$) calls the control station terminal unit (AT) 3A and transmits the data (data with a destination of the terminal unit ($T_{10}$)) when the control station terminal unit (AT) 3A is connected. Meanwhile, the control station terminal unit (AT) 3A receives such data and stores it in memory. The communication mode deciding function 12-2A at the control station terminal unit (AT) 3A confirms the communication mode for the terminal unit ($T_{10}$) and calls the terminal unit ($T_{10}$) by selecting private line 2. When connection is established to the terminal unit ($T_{10}$), data is transmitted. Corresponding to this transmission of data, the terminal unit ($T_{10}$) receives the data.

When the terminal unit ($T_1$) makes communication with the terminal unit ($T_4$), the control station terminal unit (BT) 3B is additionally interposed between the communication mode deciding function 12-2A shown in FIG. 28 and the terminal unit ($T_{10}$), Operation flow of the communication processing system shown in FIG. 8 corresponds to the operation explained in regard to FIG. 21 to FIG. 28.

In FIG. 8, indication of "simple/plural" means that the communication network is formed by single network or a plurality of networks (including the case where at least one private line is used). Moreover, in FIG. 8, indication of "self network/distant network" to which communication to the terminal unit in the network to which the self terminal unit belongs and communication to the terminal unit in the network other than that to which the self terminal unit belongs.

In each operation flow from FIG. 3 to FIG. 6, it may be thought that the processing of "communication mode decision" of FIG. 8 begins in the step of "communication processing system".

The communication mode decision is made by the communication mode deciding function 12-2A explained with reference to FIG. 21. The flow described in the latter stages of "communication processing system" shown in each operation flows in FIG. 3 to FIG. 6 indicates the flow corresponding to the case where direct communication can be made without routing through the control station terminal units AT, BT . . . as in the case where the terminal unit $T_1$ shown in FIG. 21, for example, makes communication with the terminal unit $T_2$ in the same group. However, in general, as explained with reference to FIG. 21, the communication network is complicated and conforms to the operation flow of FIG. 8.

In the "communication mode decision" of FIG. 8, "sharing" is carried out. In case the direct communication can be made without using the control station terminal units (AT, BT, CT, DT), the operation flowcharts shown in FIG. 3 to FIG. 6 start. However, the decision is made for "single/plural" when communication is made through the control station terminal unit.

In the case of "single" the "interterminal communication system" mode, explained with reference to FIG. 22 and FIG. 23, for communication to the terminal unit $T_{11}$ from the terminal unit $T_1$ is performed in a communication network where the private line 2 of FIG. 21 does not exist In the case of "plural" decision of "self network/distant network" is made.

In the case of the self network or distant network, the operation flowcharts are substantially the same and therefore explanation will be made only for the self network. In this case, the operation flowchart is the same as that of FIG. 28. However, in the case of FIG. 8, the operation flowchart may be thought to be that after it becomes apparent that the control terminal unit of the self network is to be called.

In the case where the terminal unit $T_1$ of FIG. 21 makes communication with the terminal unit $T_4$, the control station terminal (AT) 3A of the self network calls the control station terminal unit (BT) 3B for transmission of data and the distant terminal unit $T_4$ number. In this case, the data of chat, data of distribution and data of RCS are used.

The called control station terminal unit (BT) 3B receives data and stores it to confirm the distant terminal unit $T_4$.

Thereafter, the network corresponding to the terminal unit $T_4$ is selected. Namely, in this case, the communication mode for making communication with the terminal unit $T_4$ is set by the communication mode deciding function 12-2B in the control station terminal unit (BT) 3B. Based on this result, the control station terminal unit (BT) 3B calls the terminal unit $T_4$ and transmits data. When the terminal unit $T_4$ receives data, the control station terminal unit (BT) 3B repeats transmission several times when the terminal unit which is requested to transmit data exists.

Although not apparent in the operation flowchart shown in FIG. 8, in order to avoid undesirably acquiring the line for a long period for communication with distant terminal unit in the case of chat and RCS, the communication is made, as shown in FIG. 3 and FIG. 6, so that when the single communication is terminated, the line is once disconnected and is then connected again when necessary data appears. As is explained with reference to FIG. 1, this communication can be made using the connecting timing table 17.

As explained above, the network control system of the present invention can be applied to effectively utilize the communication network for operations such as chat, distribution and RCS and processing for absent distant terminal unit under the control of complicated communication network.

What is claimed is:

1. A network control system, comprising:

a plurality of terminal units, each providing a screen display, transmitting information including the screen display to other of said terminal units, a chat function for real-time communication with other of said terminal units through operation of a keyboard, each of said terminal units being connected to a communication network to realize communication based on one of the screen display and chat function between said terminal units, wherein modes corresponding to respective functions and a communication code in an operation mode are contained within communication commands transmitted by at least one of said terminal units transmitting to other of said terminal units as distant subscriber units;

a communication line connecting said distant subscriber units; and a connection timing table indexed by decoding the mode and communication code in said one of the terminal units transmitting to said distant terminal units, wherein said communication line is opened and closed in dependence upon the connection timing table, wherein instructions for connecting and disconnecting said communication line correspond to communication codes in the communication modes stored in said connection timing table, and wherein said communication line is disconnected for each transmission and reception for communication in chat mode, wherein those of said terminal units connected to a same communication network are formed into a group, at least one control station terminal unit being provided for each group, a control station terminal unit in each group extracts terminal unit information for a transmitting terminal unit in the each group, a terminal unit in another group notifies terminal information corresponding to an inquiry from at least a terminal unit in the another group, the inquiring terminal unit detects the terminal information corresponding to a distant subscriber terminal unit and makes communication with said distant subscriber terminal unit through at least one of a control station terminal unit in the other group and a control station terminal unit in the group of said distant subscriber terminal unit, the communication network comprises:
 a public network, and
 a private network comprising at least one private line, and at least one terminal unit in each of at least two groups being connected to the public network and the private network for communication between said at least two groups, said public network being connected to said private network by at least one connection point, said at least one connection point being a closest connection point between a terminal located in the public network and the private network and being located closest to one of the at least one terminal unit located in the public network such that the communication between said at least two groups is maximized through the private network and minimized through the public network.

* * * * *

UNITED STATES PATENT AND TRADEMARK OFFICE
CERTIFICATE OF CORRECTION

PATENT NO. : 5,528,671
DATED : June 18, 1996
INVENTOR(S) : Tadamitsu RYU et al.

It is certified that error appears in the above-indentified patent and that said Letters Patent is hereby corrected as shown below:

Col. 3, line 48, change "the" to --a--;
       line 53, delete "transmitting";
       line 57, insert --,-- after "intended", and insert --,-- after "things".

Col. 4, line 37, --The-- begins the new paragraph.

Col. 5, line 52, insert --12;-- after "Fig.".

Col. 6, line 40, insert --,-- after "(";
       line 41, change "ordinary" to --ordinarily--;
       line 44, change "ordinary" to --ordinarily--;
       line 51, insert --right-hand-- after "the" (first occurrence).

Col. 8, line 54, change "46" to --4-6--.

Col. 9, line 23, change "to" to -- - --.

Col. 10, line 6, change "41" to --$4_1$--;
       line 38, insert --for-- after "and";
       line 67, insert --,-- after "$4_3$".

Col. 11,
       line 42, should be indented;
       line 49, change "4 n" to --4n--.

UNITED STATES PATENT AND TRADEMARK OFFICE
CERTIFICATE OF CORRECTION

PATENT NO. : 5,528,671
DATED : June 18, 1996
INVENTOR(S) : Tadamitsu RYU et al.

It is certified that error appears in the above-indentified patent and that said Letters Patent is hereby corrected as shown below:

Col. 13, line 27, change "o" to --.--;.

Col. 14, line 37, change "44" to --4--;
       line 65, --The-- begins new paragraph;
       line 67, --Fig.-- begins new paragraph.

Col. 15, line 49, change "(c)" to --(C)--.

Col. 16, line 18, insert --,-- after "case".

Col. 17, line 6, insert --an-- after "ing";
       line 27, change "6" to --76--;
       line 50, insert --the-- after "transmits".

Col. 21, line 5, --The-- begins new paragraph.

Col. 22, line 64, change "," to --.--.

Col. 23, line 18, change "flows" to --flow--;
       line 38, insert --.-- after "exist".

Signed and Sealed this

Fourth Day of February, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,528,671
DATED : June 18, 1996
INVENTOR(S) : Tadamitsu RYU et al.

It is certified that error appears in the above-indentified patent and that said Letters Patent is hereby corrected as shown below:

Col. 11, line 24, delete "the" (second occurrence).

Signed and Sealed this

First Day of April, 1997

BRUCE LEHMAN

Attest:

Attesting Officer

Commissioner of Patents and Trademarks